US008889810B2

(12) United States Patent
Takeda et al.

(10) Patent No.: US 8,889,810 B2
(45) Date of Patent: Nov. 18, 2014

(54) ADHESIVE COMPOSITION AND ADHESIVE DRY FILM

(75) Inventors: Takanobu Takeda, Annaka (JP); Kyoko Soga, Annaka (JP); Satoshi Asai, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 227 days.

(21) Appl. No.: 13/401,940

(22) Filed: Feb. 22, 2012

(65) Prior Publication Data

US 2012/0213993 A1 Aug. 23, 2012

(30) Foreign Application Priority Data

Feb. 23, 2011 (JP) ................................. 2011-036670

(51) Int. Cl.
*C08G 77/60* (2006.01)
*C08G 77/14* (2006.01)
*C09J 183/14* (2006.01)
*C09J 183/16* (2006.01)
*C08G 77/52* (2006.01)
*C09J 183/06* (2006.01)

(52) U.S. Cl.
CPC ............... *C09J 183/06* (2013.01); *C08G 77/14* (2013.01); *C09J 183/14* (2013.01); *C09J 183/16* (2013.01); *C08G 77/52* (2013.01)
USPC ............... 528/26; 528/35; 257/791; 257/793; 428/447

(58) Field of Classification Search
USPC ................ 528/35, 26; 428/447; 257/791, 793
See application file for complete search history.

(56) References Cited

U.S. PATENT DOCUMENTS

| 3,159,601 | A | 12/1964 | Ashby |
| 3,159,662 | A | 12/1964 | Ashby |
| 3,220,972 | A | 11/1965 | Lamoreaux |
| 3,775,452 | A | 11/1973 | Karstedt |
| 6,680,007 | B2 * | 1/2004 | Honda et al. ................... 252/511 |
| 2003/0064305 | A1 | 4/2003 | Ono et al. |
| 2008/0182087 | A1 * | 7/2008 | Kato et al. ................. 428/195.1 |
| 2008/0308225 | A1 * | 12/2008 | Kanamaru et al. ............ 156/322 |
| 2010/0069523 | A1 | 3/2010 | Alvarez et al. |

FOREIGN PATENT DOCUMENTS

| JP | 2002-351070 A | 12/2002 |
| JP | 2003-48989 A | 2/2003 |
| JP | 2003-177528 A | 6/2003 |
| JP | 2003-253220 A | 9/2003 |
| JP | 2010-50346 A | 3/2010 |

OTHER PUBLICATIONS

Extended European Search Report issued Jun. 4, 2012, in European Patent Application No. 12156466.0.
Hasegawa et al., "Synthesis and Property of Novel Epoxy Resin Having Siloxane Units (1)," Journal of The Adhesion Society of Japan, 2000, vol. 36, No. 9, pp. 355-361 with English abstract.

* cited by examiner

*Primary Examiner* — Margaret Moore
(74) *Attorney, Agent, or Firm* — Birch, Stewart, Kolasch & Birch, LLP

(57) ABSTRACT

An adhesive composition useful in bonding a protective glass with a silicon substrate of a semiconductor device contains (A) an epoxy-containing high-molecular compound and (B) a solvent. The compound (A) has a weight average molecular weight of 3,000 to 500,000 and repeating units represented by the following formula (1):

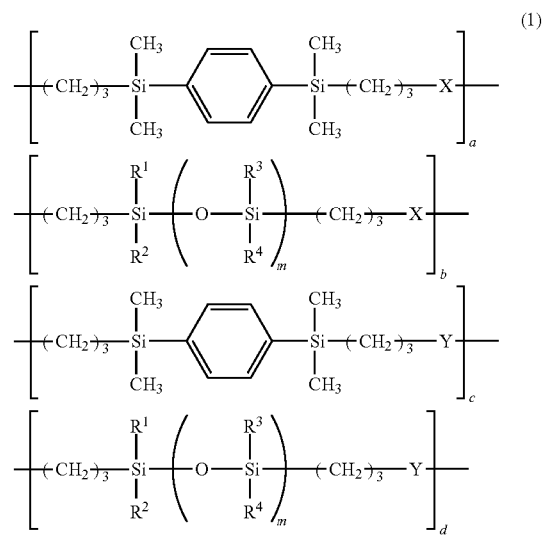

wherein $R^1$ to $R^4$ each represent a monovalent hydrocarbon group, m is 1 to 100, a, b, c and d indicate ratios of respective repeating units based on a number of all repeating units and each stand for 0 or a positive number with a proviso that c and d are not 0 at the same time and $0<(c+d)/(a+b+c+d)\leq 1.0$ is satisfied, and X and Y are phenolic hydroxyl-containing, divalent aromatic groups.

11 Claims, 1 Drawing Sheet

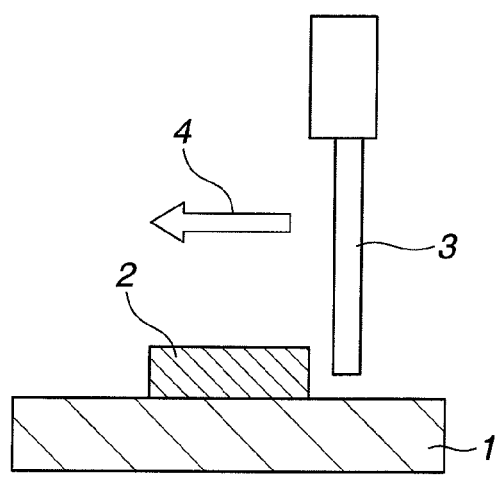

ADHESIVE COMPOSITION AND ADHESIVE DRY FILM

CROSS-REFERENCE TO RELATED APPLICATION

This non-provisional application claims priority under 35 U.S.C. §119(a) on Patent Application No. 2011-036670 filed in Japan on Feb. 23, 2011, the entire contents of which are hereby incorporated by reference.

TECHNICAL FIELD

This invention relates to a novel adhesive composition comprising an epoxy-containing high-molecular silane compound, and also to a novel adhesive dry film making use of the adhesive composition.

Specifically, this invention relates to an adhesive composition, which has high adhesive properties, heat resistance, chemical resistance, insulating properties and transmittance properties and is suitably usable for bonding applications of protective glass and semiconductor devices, especially protective glass and silicon substrates with solid-state image sensors such as CCD (Charge-Coupled Device) or CMOS (Complementary Metal Oxide Semiconductor) image sensors formed thereon, and also to an adhesive dry film making use of the adhesive composition.

BACKGROUND ART

Conventionally, the package structure for a CCD or CMOS image sensor takes a system that to protect a sensor section from foreign matter such as water and dust, the sensor section is bonded to a protective glass with a liquid or film-form, photocurable photosensitive resin composition applied by a printing method such as dispensing. The application of such an adhesive by a photolithographic method first includes coating a photosensitive adhesive composition or laminating a photosensitive adhesive film on a silicon substrate or glass substrate to form a photosensitive adhesive layer. After the photosensitive adhesive layer is next subjected to exposure, baking and development, a protective glass substrate (silicon substrate) is brought into close contact with the resulting adhesive layer, followed by pressing under heat to bond the adhesive layer and the protective glass substrate together. Subsequently, heat curing and dicing are performed to obtain hollow-structure packages. As such photosensitive resin compositions, there have been disclosed a photosensitive resin composition containing an acrylic resin, photopolymerizable compound and photopolymerization initiator (Patent Document 1: JP-A 2002-351070), a photosensitive resin composition containing a photosensitive, modified epoxy resin, photopolymerization initiator, diluting solvent and heat-curable compound (Patent Document 2: JP-A 2003-177528), and so on.

As a simple heat-curable adhesive, an adhesive dry film containing a polyimide resin, curable compound and silane coupling agent has been also disclosed (Patent Document 3: JP-A 2003-253220).

SUMMARY OF THE INVENTION

However, the photosensitive resin compositions described in Patent Documents 1 and 2 involve drawbacks in that they are insufficient in properties such as adhesive properties required as adhesives and hermetic sealing properties and hygroscopicity after heat curing and they also result in high-cost and low-productivity packaging as the three steps of exposure, baking and development are essential for packaging. On the other hand, the heat-curable adhesive described in Patent Document 3 is also insufficient in properties such as adhesive properties, heat resistance and light resistance.

Further, the three-dimensional packaging technology that makes use of through-silicon-via (TSV) electrodes is recently becoming mainstream in the fabrication of CMOS image sensors. For this three-dimensional packaging, it is essential to adhere a protective glass with a silicon substrate with a CMOS image formed thereon, and after heat curing, to perform back-side polishing on the silicon substrate to reduce the silicon substrate into a thin film of 100 μm or less. A new problem has, however, arisen here in that after the back-side polishing, the adhered substrate warps significantly. This problem becomes pronounced especially with large-diameter wafers of 8 (inches) and larger.

Thus, an object of the present invention is to provide an adhesive composition comprising an epoxy-containing high-molecular silicone compound, which assures low fabrication cost and high productivity as none of exposure, baking and development steps are needed, is good in properties such as adhesive properties required as an adhesive and hermetic sealing properties and hygroscopicity after heat curing, and is high in the reliability such as the heat resistance and light resistance of a cured film and enables to reduce warpage of an adhered substrate after back-side polishing required in three-dimensional packaging. Another object of the present invention is to provide an adhesive dry film making use of the adhesive composition.

The present inventors have earnestly studied in order to attain the above-described objects. As a result, it has been found that an adhesive composition comprising an epoxy-containing compound having the below-described formula (1) and an adhesive dry film making use of the adhesive composition are excellent as adhesives for the fabrication of CCD or CMOS image sensors, leading to the completion of the present invention.

In one aspect of the present invention, there is provided an adhesive composition comprising the following components (A) and (B):

(A) an epoxy-containing high-molecular compound having a weight average molecular weight of 3,000 to 500,000 and repeating units represented by the following formula (1):

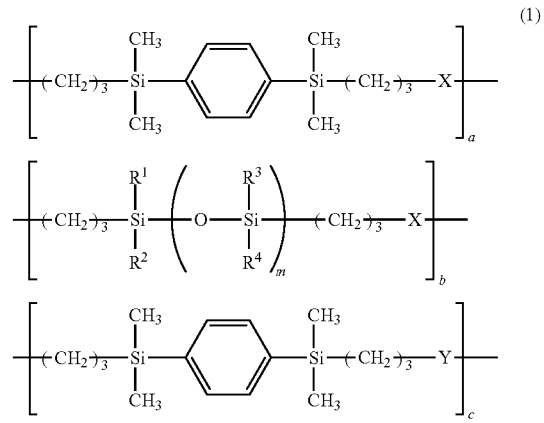

-continued

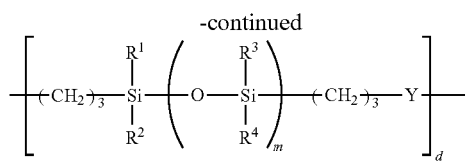

wherein $R^1$ to $R^4$ may be the same or different and each represent a monovalent hydrocarbon group having 1 to 8 carbon atoms, m is an integer of 1 to 100, a, b, c and d indicate ratios of respective repeating units based on a number of all repeating units and each stand for 0 or a positive number with a proviso that c and d are not 0 at the same time and $0<(c+d)/(a+b+c+d)\le 1.0$ is satisfied, X is a divalent organic group represented by the following formula (2), Y is a divalent organic group represented by the following formula (3), and at least one divalent organic group represented by the formula (3) exists.

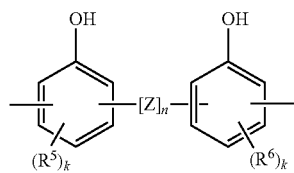

(2)

wherein Z is a divalent organic group selected from

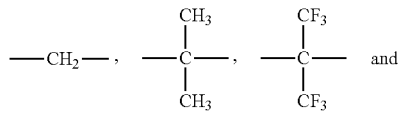

and

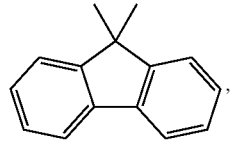

n is 0 or 1, $R^5$ and $R^6$ each represent an alkyl group or alkoxy group having 1 to 4 carbon atoms and may be the same or different, and k is 0, 1 or 2,

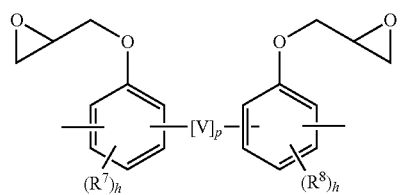

(3)

wherein V is a divalent organic group selected from

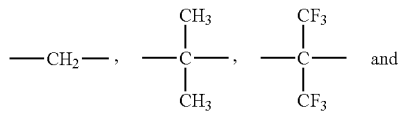

and

-continued

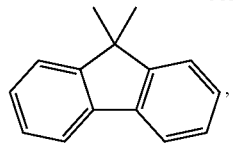

p is 0 or 1, $R^7$ and $R^8$ each represent an alkyl group or alkoxy group having 1 to 4 carbon atoms and may be the same or different, and h is 0, 1 or 2; and (B) a solvent.

Preferably, $0.05\le c/(a+b+c+d)\le 0.5$ is satisfied, and $0.05\le d/(a+b+c+d)\le 0.5$ is also satisfied in formula (1).

The adhesive composition may further include: (C) an acid anhydride. The acid anhydride (C) may preferably be represented by the following formula (4):

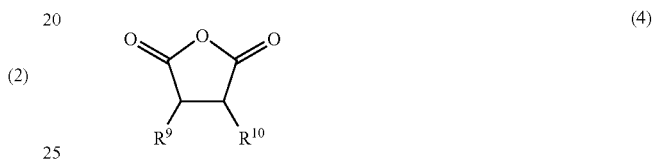

(4)

wherein $R^9$ and $R^{10}$ each represent a hydrogen atom, or a substituted or unsubstituted alkyl group or SiO-containing alkyl group having 1 to 10 carbon atoms and may be the same or different; and $R^9$ and $R^{10}$ may be bonded to each other to form a 3-membered to 7-membered ring structure together with the carbon atoms to which $R^9$ and $R^{10}$ are bonded, or in each two molecules of the acid anhydride represented by the formula (4), respective $R^9$s and respective $R^{10}$s may each be bonded to each other to form a 4-membered to 12-membered ring structure together with the carbon atoms to which the corresponding ones of the $R^9$s and $R^{10}$s are bonded, or respective $R^9$s or respective $R^{10}$s may be bonded to each other directly or via an alkylene group which may contain an oxygen atom or a siloxane bond, or in each two molecules of the acid anhydride represented by the formula (4), $R^9$ and $R^{10}$ in each molecule may be bonded to each other to form a 3-membered to 7-membered ring structure together with the carbon atoms to which $R^9$ and $R^{10}$ are bonded, and one carbon atoms in the respective ring structures may be bonded to each other.

In the adhesive composition, the acid anhydride (C) may preferably be selected from the group consisting of phthalic anhydride, trimellitic anhydride, pyromellitic anhydride, benzophenonetetracarboxylic acid anhydride, ethylene glycol bistrimellitate, maleic anhydride, tetrahydrophthalic anhydride, methyltetrahydrophthalic anhydride, endomethylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexenedicarboxylic acid anhydride, and acid anhydrides represented by the following formulas:

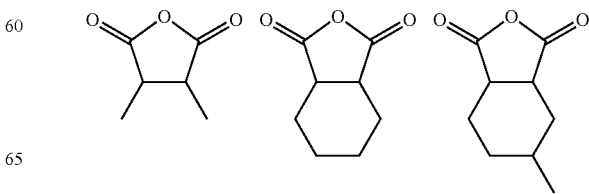

-continued

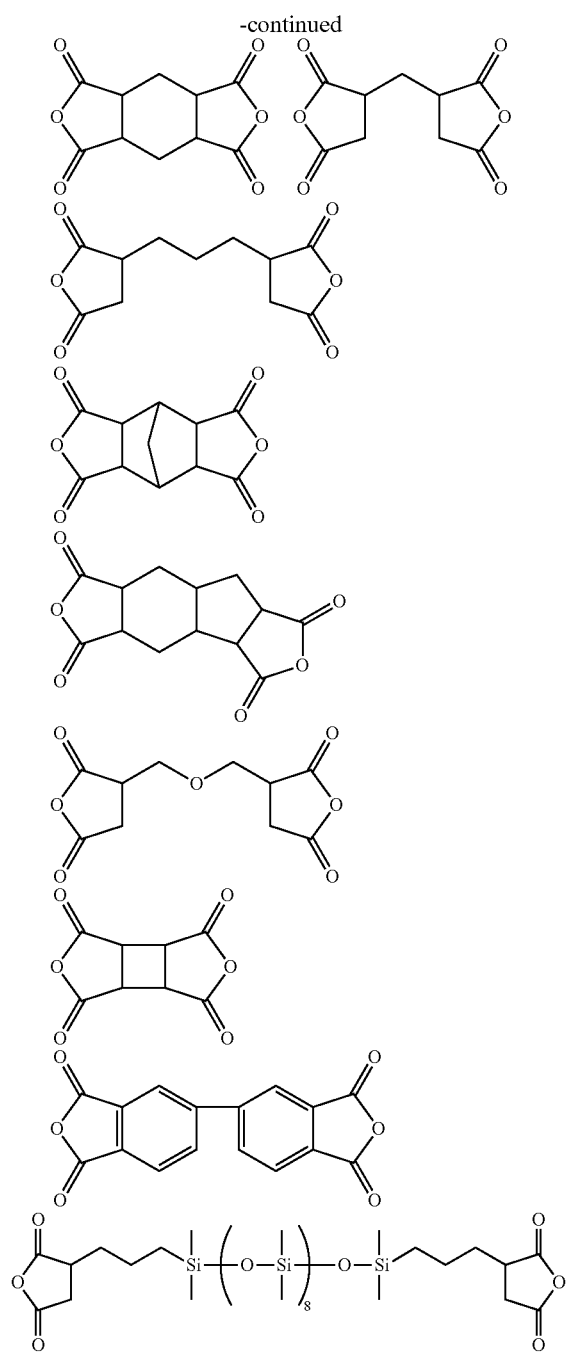

The adhesive composition may further include: (D) an antioxidant.

The adhesive composition may further include: (E) an epoxy-containing crosslinking agent.

The adhesive composition may further include: (F) a basic compound or base generating agent.

The adhesive composition may be used for CCD or CMOS image sensor.

In another aspect of the present invention, there is also provided an adhesive dry film including a base film and an adhesive resin layer formed on the base film from the above-described adhesive composition.

The present invention also provides a solid-state image sensor device comprising a laminate formed from a substrate, a layer of the above-said adhesive composition, and a protective glass plate, said substrate being selected from the group consisting of silicon wafers, silicon wafers with solid-state image sensors formed thereon, plastic substrates, ceramic substrates, and metal circuit boards.

Advantageous Effects of the Invention

The use of the adhesive composition or adhesive dry film according to the present invention, which makes use of the epoxy-containing high-molecular silicone compound, enables low-cost and high-productivity packaging as none of exposure, baking and development steps are needed for packaging, can provide good properties such as good adhesive properties as adhesives and good hermetic sealing properties and hygroscopicity after heat curing, can provide a cured film with high reliability such as high heat resistance and light resistance, and can also reduce warpage of an adhered substrate after back-side polishing required in three-dimensional packaging. The adhesive composition and adhesive dry film according to the present invention can, therefore, be suitably used in the fabrication of CCD or CMOS image sensors.

BRIEF DESCRIPTION OF THE DRAWING

FIG. 1 is a simplified schematic view illustrating an adhesion measuring method used in examples to be described subsequently herein.

DESCRIPTION OF THE EMBODIMENTS

The epoxy-containing high-molecular compound (which may hereinafter be called "the silphenylene skeleton-containing, high-molecular compound" or simply "the high-molecular compound") useful in the present invention is a high-molecular compound, which has a weight average molecular weight of 3,000 to 500,000 and repeating units represented by the following formula (1):

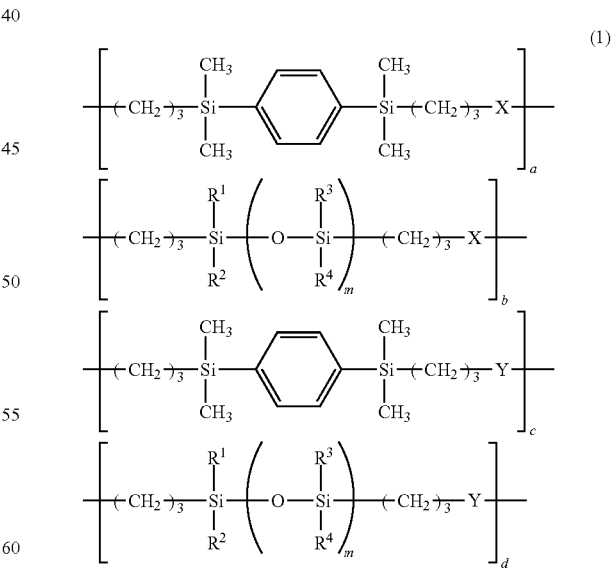

In the formula (1), $R^1$ to $R^4$ may be the same or different, and each represent a monovalent hydrocarbon group having 1 to 8 carbon atoms, preferably 1 to 6 carbon atoms. Specific examples include linear, branched and cyclic alkyl groups such as methyl, ethyl, propyl, isopropyl, n-butyl, tert-butyl and cyclohexyl; linear, branched and cyclic alkenyl groups such as vinyl, allyl, propenyl, butenyl, hexenyl and cyclohexenyl; aryl groups such as phenyl and tolyl; aralkyl groups such as benzyl and phenylethyl; and the like.

From the viewpoints of adhesive properties and film formability to be described subsequently herein, m is a positive number of 1 to 100, with 1 to 80 being preferred. From the viewpoints of adhesive properties and the warp and reliability of a joined wafer, a, b, c and d each stand for 0 or a positive number with a proviso that c and d are not 0 at the same time and $0<(c+d)/(a+b+c+d)\leq 1.0$, preferably $0.1\leq(c+d)/(a+b+c+d)\leq 0.5$, more preferably $0.15\leq(c+d)/(a+b+c+d)\leq 0.25$ is satisfied. In this case, $0.05\leq c/(a+b+c+d)\leq 0.4$, especially $0.1\leq c/(a+b+c+d)\leq 0.15$; and $0.05\leq d/(a+b+c+d)\leq 0.4$, especially $0.2\leq d/(a+b+c+d)\leq 0.25$ may be preferred. Further, a and b may be preferred to satisfy $0.4\leq a/(a+b+c+d)\leq 0.9$ and $0.4\leq b/(a+b+c+d)\leq 0.9$, respectively. It is to be noted that a+b+c+d equals to 1.

In addition, X and Y are selected from phenolic hydroxyl-containing, divalent aromatic groups represented by the below-described formulas (2) and (3), respectively. It is to be noted that the high-molecular compound useful in the present invention contains at least one divalent aromatic group represented by the formula (3).

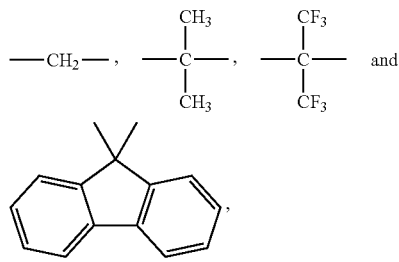

(2)

wherein Z is a divalent organic group selected from

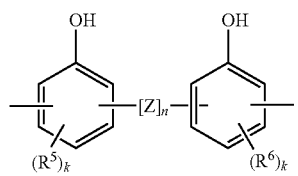

n is 0 or 1, $R^5$ and $R^6$ each represent an alkyl group or alkoxy group having 1 to 4 carbon atoms and may be the same or different, and k is 0, 1 or 2.

Specific examples of $R^5$ and $R^6$ include methyl, ethyl, isopropyl, tert-butyl, methoxy, ethoxy, isopropyloxy, and the like.

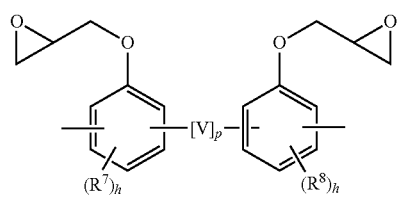

(3)

wherein V is a divalent organic group selected from

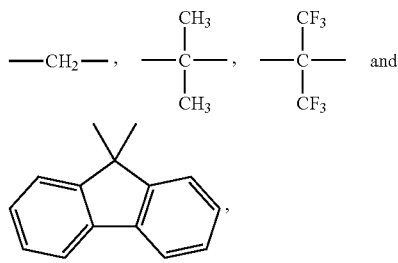

p is 0 or 1, $R^7$ and $R^8$ each represent an alkyl group or alkoxy group having 1 to 4 carbon atoms and may be the same or different, and h is 0, 1 or 2.

Specific examples of $R^7$ and $R^8$ can be similar to those of $R^5$ and $R^6$.

The weight average molecular weight of the silphenylene skeleton-containing, high-molecular compound useful in the present invention is 3,000 to 500,000, preferably 5,000 to 300,000 from the viewpoints of the compatibility and photocurability of the photocurable resin composition making use of the high-molecular compound and the mechanical properties of cured products formed from the composition. It is to be noted that the weight average molecular weight is a polystyrene equivalent as determined by gel permeation chromatography (GPC).

The silphenylene skeleton-containing, high-molecular compound useful in the present invention can be produced by subjecting hydrogensilphenylene [1,4-bis(dimethylsilyl)-benzene] of the following formula (5):

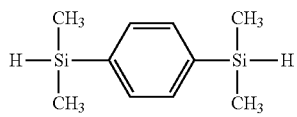

(5)

or this hydrogensilphenylene and a dihydroorganosiloxane of the following formula (6):

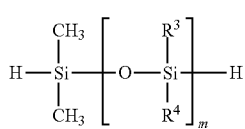

(6)

wherein $R^3$, $R^4$ and m are the same as defined above, and a specific epoxy-containing compound having two allyl groups and represented by the following formula (7):

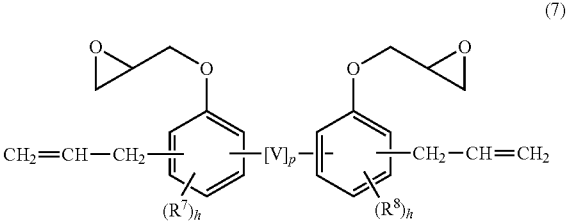

(7)

wherein V, R⁷, R⁸, p and h are the same as defined above, and if necessary, a specific phenol compound having two allyl groups and represented by the following formula (8):

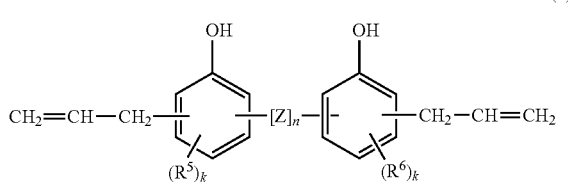

(8)

wherein X, R⁵, R⁶, n and k are the same as defined above, to the so-called "hydrosilylation" polymerization reaction in the presence of a catalyst.

Further, the weight average molecular weight of the epoxy-containing high-molecular compound, which has the repeating units represented by the formula (1) and is useful in the present invention, can be easily controlled by adjusting the ratio of the total number of allyl groups in the respective compounds represented by the formula (7) and the formula (8) to the total number of hydrosilyl groups in the hydrogensilphenylene represented by the formula (5) or in this hydrogensilphenylene and the dihydroorganosiloxane represented by the formula (6) (the total number of allyl groups/the total number of hydrosilyl groups). As an alternative, the weight average molecular weight can also be easily controlled by using, for example, a monoallyl compound such as O-allylphenol, a monohydrosilane such as triethylhydrosilane, or a monohydrosiloxane as a molecular weight modifier upon polymerization of the diallylphenol compound (7) or the diallylphenol compounds (7) and (8) with the hydrogensilphenylene (5) and dihydroorganosiloxane (6).

Examples of the catalyst employed in the above-described polymerization reaction include platinum group elemental metals such as platinum (including platinum black), rhodium and palladium; platinum chloride, chloroplatinic acid and chloroplatinic acid salts such as H₂PtCl₄.xH₂O, H₂PtCl₆.xH₂O, NaHPtCl₆.xH₂O, KHPtCl₆.xH₂O, Na₂PtCl₆.xH₂O, K₂PtCl₄.xH₂O, PtCl₄.xH₂O, PtCl₂, and Na₂HPtCl₄.xH₂O wherein x is preferably an integer of 0 to 6, with 0 or 6 being particularly preferred; alcohol-modified chloroplatinic acids (U.S. Pat. No. 3,220,972); complexes of chloroplatinic acid with olefins (U.S. Pat. No. 3,159,601, U.S. Pat. No. 3,159,662, U.S. Pat. No. 3,775,452); platinum group metals such as platinum black and palladium supported on carriers such as alumina, silica and carbon; rhodium-olefin complexes; chlorotris(triphenylphosphine)rhodium (so-called Wilkinson catalyst); complexes of platinum chloride, chloroplatinic acid or chloroplatinic acid salts with vinyl-containing siloxanes (specifically, vinyl-containing cyclic siloxanes); and the like. The amount of the catalyst to be used may be preferably a catalytic amount, generally 0.001 to 0.1 wt % as the platinum group metal based on the total amount of the polymerization reaction mixture.

In the polymerization reaction, a solvent may be used as needed. Preferred examples of the solvent include hydrocarbon solvents such as toluene and xylene.

As conditions for the polymerization reaction, the polymerization temperature may be, for example, 40 to 150° C., specifically 60 to 120° C. from the viewpoint that the catalyst is not deactivated and the polymerization can be brought to completion in a short time.

As the polymerization time, on the other hand, it is preferred to finish the polymerization in 0.5 to 100 hours, especially 0.5 to 30 hours for the prevention of intrusion of moisture into the polymerization system although the polymerization time varies depending on the kind and amount of the polymerization product. After the polymerization reaction is finished as described above, the epoxy-containing high-molecular compound of the formula (1) useful in the present invention can be obtained by distilling off a solvent when the solvent is used.

A description will next be made about the adhesive composition according to the present invention, which makes use of the epoxy-containing high-molecular silicone compound. The adhesive composition contains (A) an epoxy-containing high-molecular silicone compound having repeating units represented by the formula (1) and (B) a solvent as essential components, preferably (C) an acid anhydride, (D) an antioxidant and (E) an epoxy-containing crosslinking agent, and further, (F) a basic compound or base generating agent as needed.

The solvent as the component (B) is required to permit dissolution of components such as the above-mentioned high-molecular compound, acid anhydride, antioxidant, epoxy-containing crosslinking agent, basic compound and base generating agent.

Illustrative of the solvent are ketones such as cyclohexanone, cyclopentanone and methyl-2-n-amylketone; alcohols such as 3-methoxybutanol, 3-methyl-3-methoxybutanol, 1-methoxy-2-propanol, and 1-ethoxy-2-propanol; ethers such as propylene glycol monomethyl ether, ethylene glycol monomethyl ether, propylene glycol monoethyl ether, ethylene glycol monoethyl ether, propylene glycol dimethyl ether, and diethylene glycol dimethyl ether; esters such as propylene glycol monomethyl ether acetate, propylene glycol monoethyl ether acetate, ethyl lactate, ethyl pyruvate, butyl acetate, methyl 3-methoxypropionate, ethyl 3-ethoxypropionate, tert-butyl acetate, tert-butyl propionate, and propylene glycol mono-tert-butyl ether acetate, and γ-butyrolactone; and the like. They can be used either singly or in combination.

Of these solvents, particularly preferred are cyclohexanone, cyclopentanone, propylene glycol monomethyl ether acetate, γ-butyrolactone, and mixed solvents thereof because of their excellent solubility for the above-mentioned high-molecular compounds.

The amount of the solvent to be added may be preferably 50 to 2,000 parts by weight, especially 100 to 1,000 parts by weight per 100 parts by weight of all solids in the components (A), (C), (D), (E) and (F) from the viewpoints of the compatibility, viscosity, and ease of application of the adhesive composition.

The acid anhydride (C) is a component for inducing a thermal crosslinking reaction in tandem with the epoxy functional groups in the high-molecular compound such that the formation of a cured film can be facilitated and the cured film is provided with still higher strength. As such acid anhydrides, those which are carboxylic acid-based acid anhydrides and are represented by the following formula (4) are preferred.

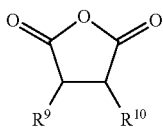

(4)

wherein $R^9$ and $R^{10}$ each represent a hydrogen atom, or a substituted or unsubstituted alkyl group or SiO-containing alkyl group having 1 to 10 carbon atoms and may be the same or different; and $R^9$ and $R^{10}$ may be bonded to each other to form a 3-membered to 7-membered ring structure together with the carbon atoms to which $R^9$ and $R^{10}$ are bonded, or in each two molecules of the acid anhydride represented by the formula (4), respective $R^9$s and respective $R^{10}$s may each be bonded to each other to form a 4-membered to 12-membered ring structure together with the carbon atoms to which the corresponding ones of the $R^9$s and $R^{10}$s are bonded, or respective $R^9$s or respective $R^{10}$s may be bonded to each other directly or via an alkylene group which may contain an oxygen atom or a siloxane bond, or in each two molecules of the acid anhydride represented by the formula (4), $R^9$ and $R^{10}$ in each molecule may be bonded to each other to form a 3-membered to 7-membered ring structure together with the carbon atoms to which $R^9$ and $R^{10}$ are bonded, and one carbon atoms in the respective ring structures may be bonded to each other.

Specific examples of the acid anhydride (C) include phthalic anhydride, trimellitic anhydride, pyromellitic anhydride, benzophenonetetracarboxylic acid anhydride, ethylene glycol bistrimellitate, maleic anhydride, tetrahydrophthalic anhydride, methyltetrahydrophthalic anhydride, endomethylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexenedicarboxylic acid anhydride, and acid anhydrides represented by the following formulas:

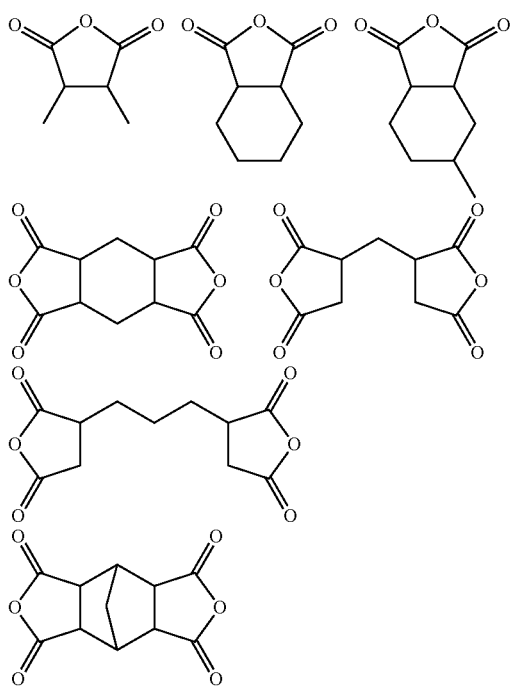

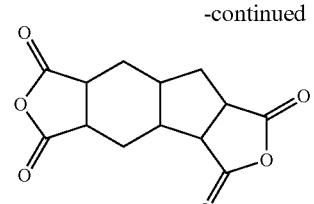

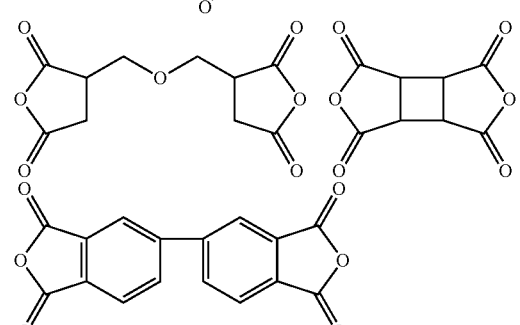

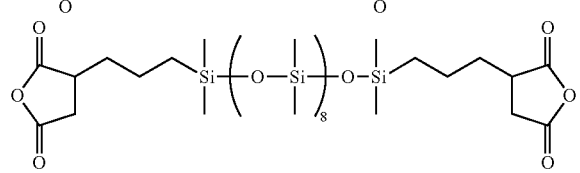

The amount of the acid anhydride to be added in the present invention may be preferably 0.5 to 50 parts by weight, more preferably 1 to 30 parts by weight per 100 parts by weight of the epoxy-containing high-molecular silicone compound from the viewpoints of the content of epoxy groups in the high-molecular compound and the curability of the high-molecular compound upon heat curing.

The antioxidant (D) is a component for providing a cured film with improved properties such as improved heat resistance and light resistance, especially for preventing a reduction in transmittance that takes place due to coloration of the film, and illustrative are hindered phenol antioxidants and hindered amine antioxidants.

Specific examples of the hindered phenol antioxidants include "IRGANOX 1330," "IRGANOX 259," "IRGANOX 3114," "IRGANOX 565" and "CHIBASSORB 119FL" (trademarks, products of BASF SE); and "ADEKASTAB AO-60" (trademark, product of Adeka Corporation). Structural formulas are shown below.

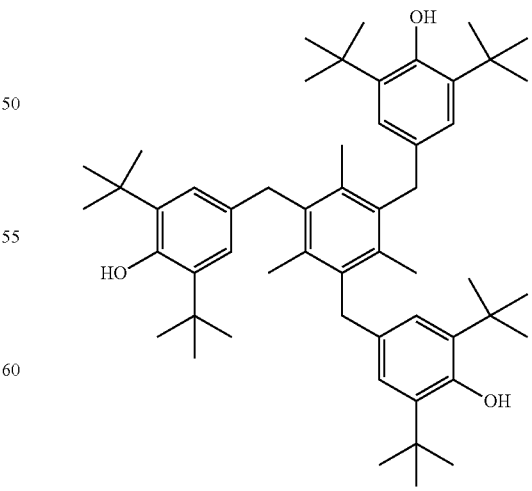

Irganox 1330

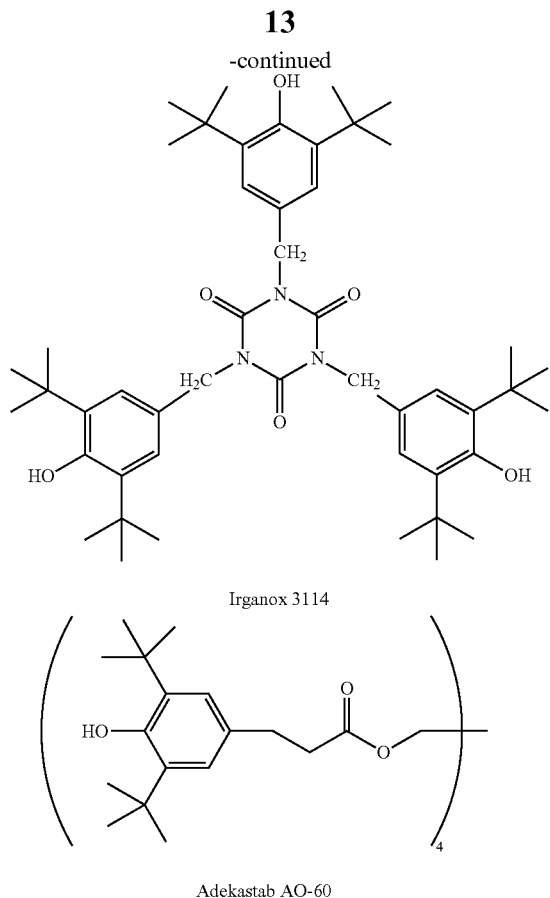

Irganox 3114

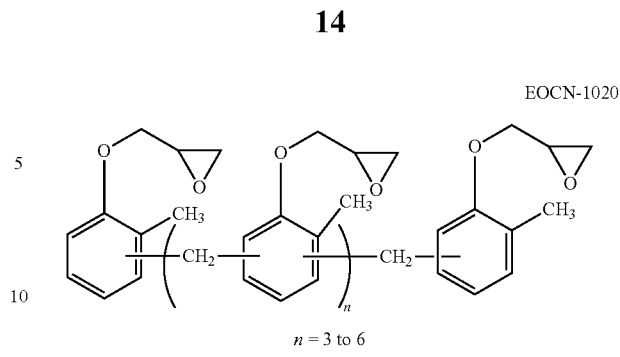

EOCN-1020

$n = 3$ to $6$

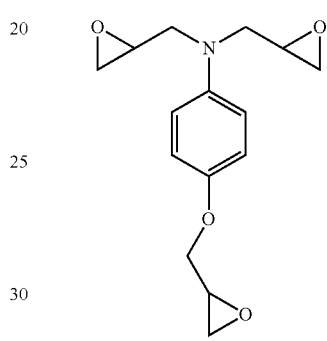

Adekastab AO-60

Specific examples of the hindered amine antioxidants include "CHIMASSORB 2020FDL," "CHIMASSORB 944FDL" and "CHIMASSORB 119FL" (trademarks, products of BASF SE).

As other antioxidants, sulfur-based heat resistant stabilizers, benzotriazole-based ultraviolet absorbers, benzophenone-based ultraviolet absorbers, and benzoate-based light stabilizers may also be added.

The amount of the antioxidant to be added may be preferably 0.1 to 10 parts by weight, more preferably 1 to 3 parts by weight per 100 parts by weight of the epoxy-containing high-molecular silicone compound. Two, three or more of such antioxidants may be added in combination.

The epoxy-containing crosslinking agent (E) is a component for additionally promoting the thermal crosslinking reaction between the acid anhydride and the epoxy functional groups in the high-molecular compound, and an epoxy-containing, bifunctional, trifunctional, tetrafunctional or higher-functionality polyfunctional crosslinking agent can be used. Epoxy-containing crosslinking agents such as bisphenol type (A type or F type), novolak type, cresol type, biphenyl type, biphenylaralkyl type or aniline type can be used.

Silicone-based or alkyl-containing crosslinking agents are also usable. Illustrative are "EOCN-1020," "EOCN-102S," "XD-1000," "NC-2000-L," "EPPN-201," "GAN" and "NC6000" (trademarks, products of Nippon Kayaku Co., Ltd.). As specific examples, the below-described crosslinking agents can be exemplified. It is to be noted that in the following formulas, Me represents a methyl group and Et represents an ethyl group.

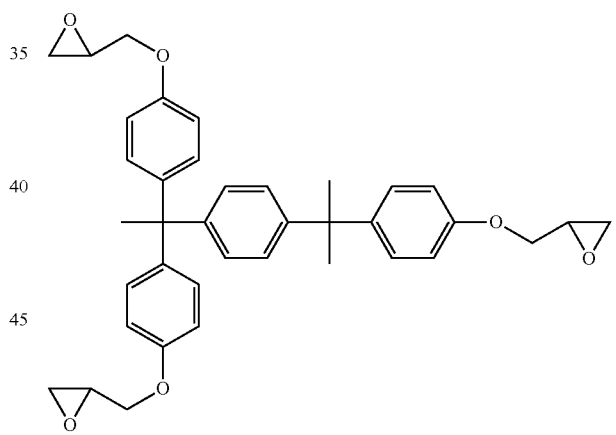

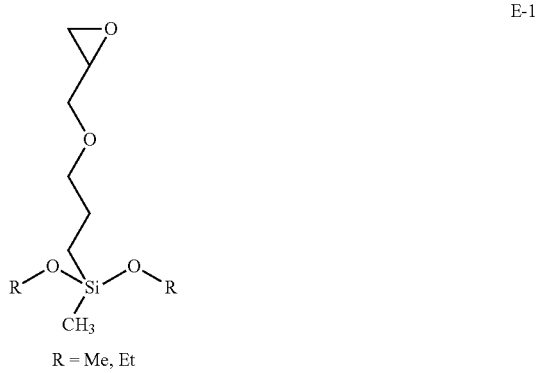

E-1

$R = Me, Et$

-continued

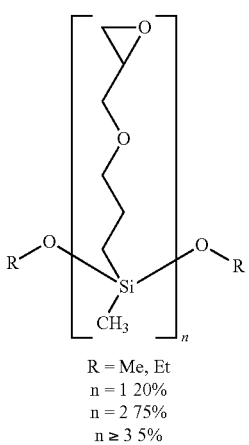

E-2

R = Me, Et
n = 1 20%
n = 2 75%
n ≥ 3 5%

The amount of the epoxy-containing crosslinking agent to be added may be preferably 0.1 to 30 parts by weight, more preferably 1 to 20 parts by weight per 100 parts by weight of the epoxy-containing high-molecular silicone compound. Two, three or more of such epoxy-containing crosslinking agents may be added in combination.

In the present invention, a basic compound or base generating compound can be added further as a component (F) as needed. This basic compound is added as a catalyst that induces a thermal crosslinking reaction between the epoxy functional groups in the high-molecular compound and the acid anhydride added in the composition. Under the action of the basic compound, it is possible to control the curing temperature that is needed for the formation of a cured film.

Examples of commercially-available products of the base generating agent include "WPBG-015," "WPBG-018," "WPBG-034" and "WPBG-057" (trademarks, products of Wako Pure Chemical Industries, Ltd.); "U-CAT 5002," "U-CAT 881" and "U-CAT 3503N" (trademarks, products of San-Apro Ltd.).

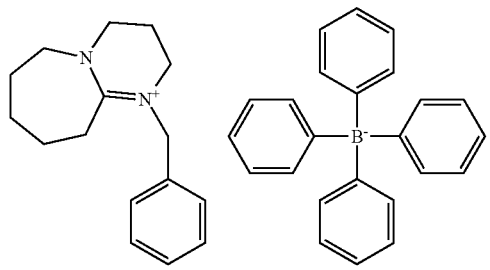

U-CAT 5002

As basic compounds, piperidine, N,N-dimethylpiperazine, triethylenediamine, benzyldimethylamine, 2-methylimidazole, and 2-ethyl-4-methylimidazole can be exemplified first as representative examples. Further examples include primary, secondary, and tertiary aliphatic amines, mixed amines, aromatic amines, heterocyclic amines, nitrogen-containing compounds having one or more carboxyl groups, nitrogen-containing compounds having one or more sulfonyl groups, nitrogen-containing compounds having one or more hydroxyl groups, nitrogen-containing compounds having one or more hydroxyphenyl groups, alcoholic nitrogen-containing compounds, amide derivatives, imide derivatives, and usual amines such as compounds represented by the following formula (11):

$$N(Z)_n(Y)_{3-n} \tag{11}$$

wherein n is 1, 2 or 3. Each side chain Z is a substituent group represented by one of the following formulas (12) to (14). When n is 2 or 3, the side chains Z may be the same or different. Each side chain Y represents a hydrogen atom or a linear, branched or cyclic alkyl group having 1 to 20 carbon atoms, and may contain one or more ether groups or hydroxyl groups. When n is 1, the side chains Y may be the same or different. Further, when n is 2 or 3, the side chains Z may be bonded together to form a ring.

In the formulas (12) to (14), $R^{300}$, $R^{302}$ and $R^{305}$ each represent a linear or branched alkylene group having 1 to 4 carbon atoms, and $R^{301}$ and $R^{304}$ each represent a hydrogen atom or a linear, branched or cyclic alkyl group having 1 to 20 carbon atoms and may each contain one or more hydroxyl, ether or ester groups or lactone rings. $R^{303}$ is a single bond or a linear or branched alkylene group having 1 to 4 carbon atoms, and $R^{306}$ is a linear, branched or cyclic alkyl group having 1 to 20 carbon atoms and may contain one or more hydroxyl, ether or ester groups or lactone rings.

Specific examples of the primary aliphatic amines include ammonia, methylamine, ethylamine, n-propylamine, isopropylamine, n-butylamine, isobutylamine, sec-butylamine, tert-butylamine, pentylamine, tert-amylamine, cyclopentylamine, hexylamine, cyclohexylamine, heptylamine, octylamine, nonylamine, decylamine, dodecylamine, cetylamine, methylenediamine, ethylenediamine, and tetraethylenepentamine.

Specific examples of the secondary aliphatic amines include dimethylamine, diethylamine, di-n-propylamine, diisopropylamine, di-n-butylamine, diisobutylamine, di-sec-butylamine, dipentylamine, dicyclopentylamine, dihexylamine, dicyclohexylamine, diheptylamine, dioctylamine, dinonylamine, didecylamine, didodecylamine, dicetylamine, N,N-dimethylmethylenediamine, N,N-dimethylethylenediamine, and N,N-dimethyltetraethylenepentamine.

Specific examples of the tertiary aliphatic amines include trimethylamine, triethylamine, tri-n-propylamine, triisopropylamine, tri-n-butylamine, triisobutylamine, tri-sec-butylamine, tripentylamine, tricyclopentylamine, trihexylamine, tricyclohexylamine, triheptylamine, trioctylamine, trinonylamine, tridecylamine, tridodecylamine, tricetylamine, N,N,N',N'-tetramethylmethylenediamine, N,N,N',N'-tetramethylethylenediamine, and N,N,N',N'-tetramethyltetraethylenepentamine.

Specific examples of the mixed amines include dimethylethylamine, methylethylpropylamine, benzylamine, phenethylamine and benzyldimethylamine.

Examples of the aromatic amines and heterocyclic amines include aniline derivatives (e.g., aniline, N-methylaniline, N-ethylaniline, N-propylaniline, N,N-dimethylaniline, 2-methylaniline, 3-methylaniline, 4-methylaniline, ethylaniline, propylaniline, trimethylaniline, 2-nitroaniline, 3-nitroaniline, 4-nitroaniline, 2,4-dinitroaniline, 2,6-dinitroaniline, 3,5-dinitroaniline and N,N-dimethyltoluidine), diphenyl(p-tolyl)amine, methyldiphenylamine, triphenylamine, phenylenediamine, naphthylamine, diaminonaphthalene, pyrrole derivatives (e.g., pyrrole, 2H-pyrrole, 1-methylpyrrole, 2,4-dimethylpyrrole, 2,5-dimethylpyrrole and N-methylpyrrole), oxazole derivatives (e.g., oxazole and isoxazole), thiazole derivatives (e.g., thiazole and isothiazole), imidazole derivatives (e.g., imidazole, 4-methylimidazole and 4-methyl-2-phenylimidazole), pyrazole derivatives, furazan derivatives, pyrroline derivatives (e.g., pyrroline and 2-methyl-1-pyrroline), pyrrolidine derivatives (e.g., pyrrolidine, N-methylpyrrolidine, pyrrolidinone and N-methylpyrrolidone), imidazoline derivatives, imidazolidine derivatives, pyridine derivatives (e.g., pyridine, methylpyridine, ethylpyridine, propylpyridine, butylpyridine, 4-(1-butylpentyl)pyridine, dimethylpyridine, trimethylpyridine, triethylpyridine, phenylpyridine, 3-methyl-2-phenylpyridine, 4-tert-butylpyridine, diphenylpyridine, benzylpyridine, methoxypyridine, butoxypyridine, dimethoxypyridine, 1-methyl-2-pyridine, 4-pyrrolidinopyridine, 1-methyl-4-phenylpyridine, 2-(1-ethylpropyl)pyridine and aminopyridine, dimethylaminopyridine), pyridazine derivatives, pyrimidine derivatives, pyrazine derivatives, pyrazoline derivatives, pyrazolidine derivatives, piperidine derivatives, piperazine derivatives, morpholine derivatives, indole derivatives, isoindole derivatives, 1H-indazole derivatives, indoline derivatives, quinoline derivatives (e.g., quinoline and 3-quinolinecarbonitrile), isoquinoline derivatives, cinnoline derivatives, quinazoline derivatives, quinoxaline derivatives, phthalazine derivatives, purine derivatives, pteridine derivatives, carbazole derivatives, phenanthridine derivatives, acridine derivatives, phenazine derivatives, 1,10-phenanthroline derivatives, adenine derivatives, adenosine derivatives, guanine derivatives, guanosine derivatives, uracil derivatives, and uridine derivatives.

Specific examples of the nitrogen-containing compounds having one or more carboxyl groups include aminobenzoic acid, indolecarboxylic acid, amino acid derivatives (e.g. nicotinic acid, alanine, arginine, aspartic acid, glutamic acid, glycine, histidine, isoleucine, glycylleucine, leucine, methionine, phenylalanine, threonine, lysine, 3-aminopyrazine-2-carboxylic acid and methoxyalanine).

Specific examples of the nitrogen-containing compounds having one or more sulfonyl groups include 3-pyridinesulfonic acid and pyridinium p-toluenesulfonate.

Specific examples of the nitrogen-containing compounds having one or more hydroxyl groups, nitrogen-containing compounds having one or more hydroxyphenyl groups and alcoholic nitrogen-containing compounds include 2-hydroxypyridine, aminocresol, 2,4-quinolinediol, 3-indolemethanol hydrate, monoethanolamine, diethanolamine, triethanolamine, N-ethyldiethanolamine, N,N-diethylethanolamine, triisopropanolamine, 2,2'-iminodiethanol, 2-aminoethanol, 3-amino-1-propanol, 4-amino-1-butanol, 4-(2-hydroxyethyl)morpholine, 2-(2-hydroxyethyl)pyridine, 1-(2-hydroxyethyl)piperazine, 1-[2-(2-hydroxyethoxy)ethyl]piperazine, piperidine ethanol, 1-(2-hydroxyethyl)pyrrolidine, 1-(2-hydroxyethyl)-2-pyrrolidinone, 3-piperidino-1,2-propanediol, 3-pyrrolidino-1,2-propanediol, 8-hydroxyjulolidine, 3-quinuclidinol, 3-tropanol, 1-methyl-2-pyrrolidine ethanol, 1-aziridine ethanol, N-(2-hydroxyethyl)phthalimide and N-(2-hydroxyethyl)isonicotinamide.

Specific examples of the amide derivatives include formamide, N-methylformamide, N,N-dimethylformamide, acetamide, N-methylacetamide, N,N-dimethylacetamide, propionamide and benzamide.

Specific examples of the imide derivatives include phthalimide, succinimide and maleimide.

Specific examples of the compounds represented by the formula (11) include, but are not limited to, tris[2-(methoxymethoxy)ethyl]amine, tris[2-(2-methoxyethoxy)ethyl]amine, tris[2-(2-methoxyethoxymethoxy)ethyl]amine, tris[2-(1-methoxyethoxy)ethyl]amine, tris[2-(1-ethoxyethoxy)ethyl]amine, tris[2-(1-ethoxypropoxy)ethyl]amine, tris[2-{2-(2-hydroxyethoxy)ethoxy}ethyl]amine, 4,7,13,16,21,24-hexaoxa-1,10-diazabicyclo[8.8.8]hexacosane, 4,7,13,18-tetraoxa-1,10-diazabicyclo[8.5.5]eicosane, 1,4,10,13-tetraoxa-7,16-diazabicyclooctadecane, 1-aza-12-crown-4, 1-aza-15-crown-5, 1-aza-18-crown-6, tris(2-formyloxyethyl)amine, tris(2-acetoxyethyl)amine, tris(2-propionyloxyethyl)amine, tris(2-butyryloxyethyl)amine, tris(2-isobutyryloxyethyl)amine, tris(2-valeryloxyethyl)amine, tris(2-pivaloyloxyethyl)amine, N,N-bis(2-acetoxyethyl)2-(acetoxyacetoxy)ethylamine, tris(2-methoxycarbonyloxyethyl)amine, tris(2-tert-butoxycarbonyloxyethyl)amine, tris[2-(2-oxopropoxy)ethyl]amine, tris[2-(methoxycarbonylmethyl)oxyethyl]amine, tris[2-(tert-butoxycarbonylmethyloxy)ethyl]amine, tris[2-(cyclohexyloxycarbonylmethyloxy)ethyl]amine, tris(2-methoxycarbonylethyl)amine, tris(2-ethoxycarbonylethyl)amine, N,N-bis(2-hydroxyethyl)2-(methoxycarbonyl)ethylamine, N,N-bis(2-acetoxyethyl)2-(methoxycarbonyl)ethylamine, N,N-bis(2-hydroxyethyl)2-(ethoxycarbonyl)ethylamine, N,N-bis(2-acetoxyethyl)2-(ethoxycarbonyl)ethylamine, N,N-bis(2-hydroxyethyl)2-(2-methoxyethoxycarbonyl)ethylamine, N,N-bis(2-acetoxyethyl)2-(2-methoxyethoxycarbonyl)ethylamine, N,N-bis(2-hydroxyethyl)2-(2-hydroxyethoxycarbonyl)ethylamine, N,N-bis(2-acetoxyethyl)2-(2-acetoxyethoxycarbonyl)ethylamine, N,N-bis(2-hydroxyethyl)-2-[(methoxycarbonyl)methoxycarbonyl]-ethylamine, N,N-bis(2-acetoxyethyl)-2-[(methoxycarbonyl)methoxycarbonyl]-ethylamine, N,N-bis(2-hydroxyethyl)2-(2-oxopropoxycarbonyl)ethylamine, N,N-bis(2-acetoxyethyl)2-(2-oxopropoxycarbonyl)ethylamine, N,N-bis(2-hydroxyethyl)2-(tetrahydrofurfuryloxycarbonyl)-ethylamine, N,N-bis(2-acetoxyethyl)2-(tetrahydrofurfuryloxycarbonyl)-ethylamine, N,N-bis(2-hydroxyethyl)-2-[(2-oxotetrahydrofuran-3-yl)oxycarbonyl]ethylamine, N,N-bis(2-acetoxyethyl)-2-[(2-oxotetrahydrofuran-3-yl)oxycarbonyl]ethylamine, N,N-bis(2-hydroxyethyl)2-(4-hydroxybutoxycarbonyl)ethylamine, N,N-bis(2-formyloxyethyl)2-(4-formyloxybutoxycarbonyl)-ethylamine, N,N-bis(2-formyloxyethyl)2-(2-formyloxyethoxycarbonyl)-ethylamine, N,N-bis(2-methoxyethyl)2-(methoxycarbonyl)ethylamine, N-(2-hydroxyethyl)bis[2-(methoxycarbonyl)ethyl]amine, N-(2-acetoxyethyl)bis[2-(methoxycarbonyl)ethyl]amine, N-(2-hydroxyethyl)bis[2-(ethoxycarbonyl)ethyl]amine, N-(2-acetoxyethyl)bis[2-(ethoxycarbonyl)ethyl]amine, N-(3-hydroxy-1-propyl)bis[2-(methoxycarbonyl)ethyl]amine, N-(3-acetoxy-1-propyl)bis[2-(methoxycarbonyl)ethyl]amine, N-(2-methoxyethyl)bis[2-(methoxycarbonyl)ethyl]amine, N-butylbis[2-(methoxycarbonyl)ethyl]amine, N-butylbis[2-(2-methoxyethoxycarbonyl)ethyl]amine, N-methylbis(2-acetoxyethyl)amine, N-ethylbis(2-acetoxyethyl)amine, N-methylbis(2-pivaloyloxyethyl)amine, N-ethylbis[2-(methoxycarbonyloxy)ethyl]amine, N-ethylbis[2-(tert-butoxycarbonyloxy)ethyl]amine, tris(methoxycarbonylmethyl)

amine, tris(ethoxycarbonylmethyl)amine, N-butylbis(methoxycarbonylmethyl)amine, N-hexylbis(methoxycarbonylmethyl)amine and β-(diethylamino)-δ-valerolactone.

These base generating agents and basic compounds can be used either singly or in combination. The amount of the base generating agent or basic compound to be added may be preferably 0 to 5 parts by weight, more preferably 0.01 to 0.5 parts by weight per 100 parts by weight of the epoxy-containing high-molecular silicone compound from the viewpoint of curing properties.

In addition to the above-described individual components, one or more additive components may also be added further to the adhesive composition according to the present invention. As such an additive component, a surfactant commonly used to improve the ease of application can be mentioned, for example.

As the surfactant, a nonionic surfactant is preferred. Illustrative are fluorine-containing surfactants, specifically perfluoroalkylpolyoxyethylene ethanols, fluorinated alkyl esters, perfluoroalkylamine oxides and fluorine-containing organosiloxane compounds.

As these surfactants, those available on the market can be used. Examples include "FLUORAD FC-4430" (trademark, product of Sumitomo 3M Limited), "SURFLON S-141" and "SURFLON S-145" (trademarks, products of Asahi Glass Co., Ltd.), "UNIDYNE DS-401," "UNIDYNE DS-4031" and "UNIDYNE DS-451" (trademarks, products of Daikin Industries, Ltd.), "MEGAFAC F-8151" (trademark, product of DIC Corporation) and "X-70-093" (trademark, product of Shi-Etsu Chemical Co., Ltd.). Of these, preferred are "FLUORAD FC-4430" (trademark, product of Sumitomo 3M Limited) and "X-70-093" (trademark, product of Shi-Etsu Chemical Co., Ltd.).

The preparation of the adhesive composition according to the present invention can be performed in a usual manner. Described specifically, the adhesive composition according to the present invention can be prepared by stirring and mixing the above-described individual components, and then filtering off solids with a filter as needed.

The adhesive composition according to the present invention prepared as described above can be suitably used as an adhesive, for example, for the fabrication of CCD or CMOS image sensors.

A description will next be made about a joining method of a silicon wafer and a glass substrate with the above-described adhesive composition upon fabrication of a CCD or CMOS image sensor.

First, the adhesive composition is applied onto the substrate. As the substrate, a silicon wafer with solid-state image sensors formed thereon can be mentioned.

This application can be performed by adopting a lithographic technology known in the past as a coating method. For example, the adhesive composition can be applied by a method such as dip coating, spin coating or roll coating. The amount to be applied can be suitably determined depending on the application purpose, but may be set at 0.1 to 100 μm, preferably 1 to 100 μm, more preferably 5 to 60 μm in terms of dry film thickness. As will be described subsequently herein, it is possible to form a dry film with this composition beforehand and then to laminate it with the substrate.

To reduce outgas upon joining with the protective glass substrate, the solvent may be evaporated beforehand at this stage by prebaking as needed. The prebaking can be conducted, for example, at 40 to 140° C. for 1 minute to 1 hour or so.

The silicon substrate (the silicon wafer with solid-state image sensors formed thereon) with the adhesive composition applied thereon as described above can be subjected to pre-joining with the protective glass substrate by using a joining apparatus. As conditions for the pre-joining, the joining temperature may be preferably 50 to 200° C., more preferably 80 to 180° C., the pre-joining holding time may be preferably 0 to 10 minutes, more preferably 1 to 5 minutes, and the joining-time depressurization may be preferably up to 100 mbar, more preferably up to $5 \times 10^{-3}$ mbar. Further, the joining can be conducted at a joining pressure of preferably 0.1 to 50 kN, more preferably 0.5 to 20 kN. By further subjecting the pre-joined substrate to heat curing, a completely-joined substrate is obtained. The heat curing can be conducted by setting the heat curing temperature at preferably 160 to 220° C., more preferably 180 to 200° C. and the curing time at preferably 0.5 to 4 hours, more preferably 1 to 2 hours.

On the other hand, the production of the adhesive dry film according to the present invention can be carried out in a usual manner, but will be described in further detail.

The base film for use in the adhesive dry film according to the present invention may be a single-layer film or a multi-layer film with plural polymer films stacked one over the other. Synthetic resin films of polyethylene, polypropylene, polycarbonate or polyethylene terephthalate are available, but as the material, polyethylene terephthalate having adequate flexibility, mechanical strength and heat resistance is preferred. Such a film can be one subjected beforehand to one or more of various treatments such as corona treatment and the coating of a releasing agent. As such a film, a commercial product can be used. Illustrative are "CERAPEEL WZ(RX)" and "CERAPEEL BX8(R)" (trademarks, products of Toray Advanced Film Co., Ltd.), "E7302" and "E7304" (trademarks, products of Toyobo Co., Ltd.), "PUREX G31" and "PUREX G71T1" (trademarks, products of Teijin DuPont Films Japan Limited), "PET38×1-A3," "PET38×1-V8" and "PET38×1-X08" (trademarks, products of Nippa Co., Ltd.).

As a protective film for use in the adhesive dry film according to the present invention, a similar one to the above-mentioned base film can be used, but a polyethylene terephthalate or polyethylene film is preferred for its adequate flexibility. As such a protective film, a commercially-available product can be used. As illustrative polyethylene terephthalate films, those exemplified above can be mentioned. As illustrative polyethylene films, "GF-8" (trademark, product of Tamapoly Co., Ltd.) and "PE FILM 0 TYPE" (trademark, product of Nippa Co., Ltd.) can be mentioned.

The thicknesses of the base film and protective film may each be preferably 10 to 100 μm, particularly preferably 25 to 50 μm from the viewpoints of the production stability of curable dry films and the prevention of core set on core tubes, i.e., so-called curling.

A description will next be made about a process for the production of the adhesive dry film in the present invention. As a production apparatus for the adhesive dry film, a film coater for producing adhesive products can be used in general. Examples of the film coater include a comma coater, comma reverse coater, multicoater, die coater, lip coater, lip reverse coater, direct gravure coater, offset gravure coater, three bottom-roll reverse coater and four bottom-roll reverse coater.

When a base film is wound out from a payoff shaft of the film coater and is allowed to move past a coater head of the film coater, the adhesive composition according to the present invention is applied to a predetermined thickness on the base film. In this case, the thickness is preferably 1 to 100 μm, more preferably 5 to 60 μm. The base film coated in this manner is then allowed to pass at a predetermined temperature for a predetermined time through a circulating hot air oven. The resulting dried adhesive resin layer, which had been dried on the base film, is caused to pass, together with a protective film wound out from another payoff shaft of the film coater, under a predetermined pressure between laminating rolls to laminate the protective film with the adhesive resin layer on the base film. Subsequently, the resulting adhesive dry film is wound up on a takeup shaft of the film coater. The predetermined temperature may preferably be 25 to 150° C., the predetermined time may preferably be 1 to 100 minutes, and the predetermined pressure may preferably be 0.01 to 5 MPa.

Further, the adhesive dry film is brought into close contact with a substrate by using a film laminating apparatus. The substrate can be, for example, a silicon wafer, a silicon wafer with solid-state image sensors formed thereon, a plastic substrate, ceramic substrate, or a metal circuit board. As the film laminating apparatus, a vacuum laminator is preferred. The silicon wafer with solid-state image sensors formed thereon is mounted on the film laminating apparatus, the protective film of the adhesive dry film is peeled off, and the adhesive resin layer so exposed is brought into close contact with the substrate under a predetermined pressure by a bonding roll on a table of a predetermined temperature in a vacuum chamber controlled at a predetermined degree of vacuum. The temperature may preferably be 60 to 120° C., the pressure may preferably be 0 to 5.0 MPa, and the degree of vacuum may preferably be 50 to 500 Pa. After having been brought into close contact as described above, the silicon substrate (i.e., the silicon wafer with solid-state image sensors formed thereon) with the adhesive dry film applied thereon is subjected, as in the case of the adhesive composition, to prebaking, pre-joining and heat curing, whereby a joined substrate can be obtained. Moreover, the joined substrate may have a protective glass plate thereon. A solid-state image sensor device used for CCD or COMS can be obtained. In this case, the solid-state image sensor device comprises the substrate, the adhesive composition layer, and the protective glass plate, wherein substrate is selected from silicon wafers, silicon wafers with solid-state image sensor formed thereon, plastic substrates, ceramic substrates, and metal circuit boards.

In case of preparing the solid-state image sensor device, the adhesive composition layer is formed on the substrate and thereafter the protective glass plate is laminated on the adhesive composition layer. Alternatively, the adhesive composition layer is formed on the protective glass plate and thereafter the substrate is provided on the adhesive composition layer.

EXAMPLES

The present invention will hereinafter be described by presenting Synthesis Examples, Examples and Comparative Examples. It should, however, be noted that the present invention shall not be limited to the following Examples. In the following Synthesis Examples, Examples and Comparative Examples, all designations of parts refer to parts by weight. The chemical structural formulas of the compounds (M-1) to (M-7) employed in the following Synthesis Examples are shown below.

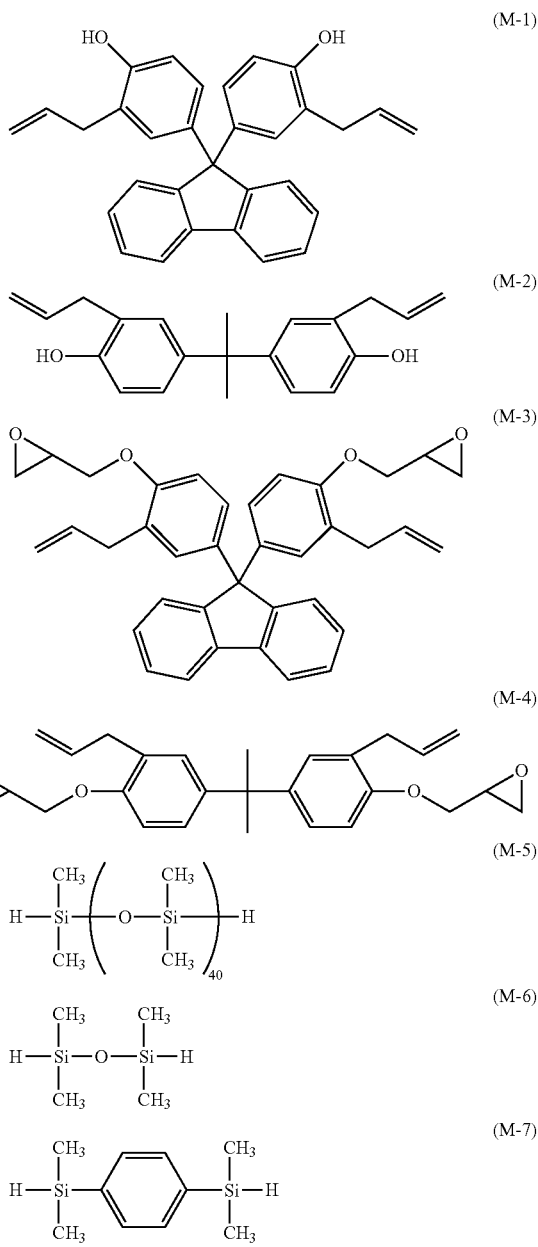

Synthesis Example 1

In a 5-L flask equipped with a stirrer, thermometer, nitrogen purge line and reflux condenser, the compound (M-1) (396.9 g) and the compound (M-4) (45.0 g) were dissolved in toluene (1,875 g). The compound (M-5) (949.6 g) and the compound (M-6) (6.1 g) were then added, followed by heating to 60° C. Subsequently, a carbon-supported platinum catalyst (5 wt %) (2.2 g) was charged. After the internal reaction temperature was confirmed to have arisen to 65 to 67° C., the reaction mixture was heated to 90° C. over 3 hours. The reaction mixture was then allowed to cool back to 60° C., at which a fresh supply (2.2 g) of the carbon-supported platinum catalyst (5 wt %) was charged, followed by dropwise addition of the compound (M-7) (107.3 g) into the flask over 1 hour. At that time, the internal temperature of the flask arose to 78° C. After completion of the dropwise addition, the reaction mixture was subjected to aging at 90° C. for 3 hours. The reaction mixture was then allowed to cool to room temperature, at which methyl isobutyl ketone (MIBK) (1,700 g) was added. The reaction mixture was then filtered under pressure through a filter to remove the platinum catalyst. Further, pure water (760 g) was added to the thus-obtained high-molecular compound solution. The resulting mixture was stirred, and was then allowed to stand for separation into layers. The lower layer, i.e., the water layer was removed. The separation and water-washing operation was repeated six times to eliminate trace acid components from the high-molecular compound solution. The solvent was distilled off under reduced pressure from the high-molecular compound solution, and cyclopentanone (950 g) was added to afford a high-molecular compound solution (A-1) having a solids concentration of 60 wt % and containing cyclopentanone as a principal solvent.

The high-molecular compound in the high-molecular compound solution was measured by GPC using HLC-8220 available from Tosoh Corporation. The high-molecular weight was found to have the structure of the recurring units of the general formula (1), and a weight average molecular weight of 62,000 in terms of polystyrene equivalent. The ratios a, b, c and d in the formula (1) were determined by molar calculation from the used amounts of the raw materials (this will apply equally hereinafter). In Synthesis Example 1, the raw materials used were (M-1), (M-4), (M-5), (M-6) and (M-7). Specifically, $a=0.594$, $b=0.351$, $c=0.061$, and $d=0.039$. X and Y were as shown below. m was 1 to 40.

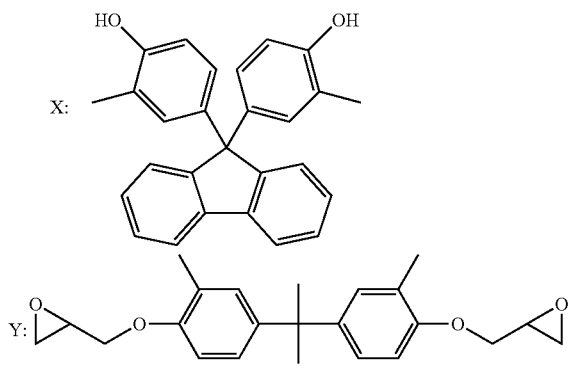

Synthesis Example 2

In a 5-L flask equipped with a stirrer, thermometer, nitrogen purge line and reflux condenser, the compound (M-1) (352.8 g) and the compound (M-4) (90.0 g) were dissolved in toluene (1,875 g). The compound (M-5) (949.6 g) and the compound (M-6) (6.1 g) were then added, followed by heating to 60° C. Subsequently, a carbon-supported platinum catalyst (5 wt %) (2.2 g) was charged. After the internal reaction temperature was confirmed to have arisen to 65 to 67° C., the reaction mixture was heated to 90° C. over 3 hours. The reaction mixture was then allowed to cool back to 60° C., at which a fresh supply (2.2 g) of the carbon-supported platinum catalyst (5 wt %) was charged, followed by dropwise addition of the compound (M-7) (107.3 g) into the flask over 1 hour. At that time, the internal temperature of the flask arose to 79° C. After completion of the dropwise addition, the reaction mixture was subjected to aging at 90° C. for 3 hours. The reaction mixture was then allowed to cool to room temperature, at which methyl isobutyl ketone (MIBK) (1,700 g) was added. The reaction mixture was then filtered under pressure through a filter to remove the platinum catalyst. Further, pure water (760 g) was added to the thus-obtained high-molecular compound solution. The resulting mixture was stirred, and was then allowed to stand for separation into layers. The lower layer, i.e., the water layer was removed. The separation and water-washing operation was repeated six times to eliminate trace acid components from the high-molecular compound solution. The solvent was distilled off under reduced pressure from the high-molecular compound solution, and cyclopentanone (980 g) was added to afford a high-molecular compound solution (A-2) having a solids concentration of 60 wt % and containing cyclopentanone as a principal solvent.

The molecular weight of the high-molecular compound in the high-molecular compound solution was measured by GPC. The high-molecular compound was found to have a weight average molecular weight of 64,000 in terms of polystyrene equivalent. In the formula (1), $a=0.480$, $b=0.320$, $c=0.120$, and $d=0.080$. X, Y and m were the same as in Synthesis Example 1.

Synthesis Example 3

In a 5-L flask equipped with a stirrer, thermometer, nitrogen purge line and reflux condenser, the compound (M-1) (308.7 g) and the compound (M-4) (135.0 g) were dissolved in toluene (1,875 g). The compound (M-5) (949.6 g) and the compound (M-6) (6.1 g) were then added, followed by heating to 60° C. Subsequently, a carbon-supported platinum catalyst (5 wt %) (2.2 g) was charged. After the internal reaction temperature was confirmed to have arisen to 65 to 67° C., the reaction mixture was heated to 90° C. over 3 hours. The reaction mixture was then allowed to cool back to 60° C., at which a fresh supply (2.2 g) of the carbon-supported platinum catalyst (5 wt %) was charged, followed by dropwise addition of the compound (M-7) (107.3 g) into the flask over 1 hour. At that time, the internal temperature of the flask arose to 80° C. After completion of the dropwise addition, the reaction mixture was subjected to aging at 90° C. for 3 hours. The reaction mixture was then allowed to cool to room temperature, at which methyl isobutyl ketone (MIBK) (1,700 g) was added. The reaction mixture was then filtered under pressure through a filter to remove the platinum catalyst. Further, pure water (760 g) was added to the thus-obtained high-molecular compound solution. The resulting mixture was stirred, and was then allowed to stand for separation into layers. The lower layer, i.e., the water layer was removed. The separation and water-washing operation was repeated six times to eliminate trace acid components from the high-molecular compound solution. The solvent was distilled off under reduced pressure from the high-molecular compound solution, and cyclopentanone (900 g) was added to afford a high-molecular compound solution (A-3) having a solids concentration of 60 wt % and containing cyclopentanone as a principal solvent.

The molecular weight of the high-molecular compound in the high-molecular compound solution was measured by GPC. The high-molecular compound was found to have a weight average molecular weight of 68,000 in terms of polystyrene equivalent. In the formula (1), $a=0.420$, $b=0.280$, $c=0.180$, and $d=0.120$. X, Y and m were the same as in Synthesis Example 1.

Synthesis Example 4

In a 5-L flask equipped with a stirrer, thermometer, nitrogen purge line and reflux condenser, the compound (M-1)

(220.5 g) and the compound (M-4) (225.0 g) were dissolved in toluene (1,875 g). The compound (M-5) (949.6 g) and the compound (M-6) (6.1 g) were then added, followed by heating to 60° C. Subsequently, a carbon-supported platinum catalyst (5 wt %) (2.2 g) was charged. After the internal reaction temperature was confirmed to have arisen to 65 to 67° C., the reaction mixture was heated to 90° C. over 3 hours. The reaction mixture was then allowed to cool back to 60° C., at which a fresh supply (2.2 g) of the carbon-supported platinum catalyst (5 wt %) was charged, followed by dropwise addition of the compound (M-7) (107.3 g) into the flask over 1 hour. At that time, the internal temperature of the flask arose to 80° C. After completion of the dropwise addition, the reaction mixture was subjected to aging at 90° C. for 3 hours. The reaction mixture was then allowed to cool to room temperature, at which methyl isobutyl ketone (MIBK) (1,700 g) was added. The reaction mixture was then filtered under pressure through a filter to remove the platinum catalyst. Further, pure water (760 g) was added to the thus-obtained high-molecular compound solution. The resulting mixture was stirred, and was then allowed to stand for separation into layers. The lower layer, i.e., the water layer was removed. The separation and water-washing operation was repeated six times to eliminate trace acid components from the high-molecular compound solution. The solvent was distilled off under reduced pressure from the high-molecular compound solution, and cyclopentanone (950 g) was added to afford a high-molecular compound solution (A-4) having a solids concentration of 60 wt % and containing cyclopentanone as a principal solvent.

The molecular weight of the high-molecular compound in the high-molecular compound solution was measured by GPC. The high-molecular compound was found to have a weight average molecular weight of 75,000 in terms of polystyrene equivalent. In the formula (1), a=0.294, b=0.206, c=0.306, and d=0.194. X, Y and m were the same as in Synthesis Example 1.

Synthesis Example 5

In a 5-L flask equipped with a stirrer, thermometer, nitrogen purge line and reflux condenser, the compound (M-1) (352.8 g) and the compound (M-3) (116.1 g) were dissolved in toluene (1,875 g). The compound (M-5) (949.6 g) and the compound (M-6) (6.1 g) were then added, followed by heating to 60° C. Subsequently, a carbon-supported platinum catalyst (5 wt %) (2.2 g) was charged. After the internal reaction temperature was confirmed to have arisen to 65 to 67° C., the reaction mixture was heated to 90° C. over 3 hours. The reaction mixture was then allowed to cool back to 60° C., at which a fresh supply (2.2 g) of the carbon-supported platinum catalyst (5 wt %) was charged, followed by dropwise addition of the compound (M-7) (107.3 g) into the flask over 1 hour. At that time, the internal temperature of the flask arose to 73° C. After completion of the dropwise addition, the reaction mixture was subjected to aging at 90° C. for 3 hours. The reaction mixture was then allowed to cool to room temperature, at which methyl isobutyl ketone (MIBK) (1,700 g) was added. The reaction mixture was then filtered under pressure through a filter to remove the platinum catalyst. Further, pure water (760 g) was added to the thus-obtained high-molecular compound solution. The resulting mixture was stirred, and was then allowed to stand for separation into layers. The lower layer, i.e., the water layer was removed. The separation and water-washing operation was repeated six times to eliminate trace acid components from the high-molecular compound solution. The solvent was distilled off under reduced pressure from the high-molecular compound solution, and cyclopentanone (940 g) was added to afford a high-molecular compound solution (A-5) having a solids concentration of 60 wt % and containing cyclopentanone as a principal solvent.

The molecular weight of the high-molecular compound in the high-molecular compound solution was measured by GPC. The high-molecular compound was found to have a weight average molecular weight of 55,000 in terms of polystyrene equivalent. In the formula (1), a=0.351, b=0.149, c=0.352, and d=0.148.

Synthesis Example 6

In a 5-L flask equipped with a stirrer, thermometer, nitrogen purge line and reflux condenser, the compound (M-1) (441.0 g) was dissolved in toluene (1,875 g). The compound (M-5) (949.6 g) and the compound (M-6) (6.1 g) were then added, followed by heating to 60° C. Subsequently, a carbon-supported platinum catalyst (5 wt %) (2.2 g) was charged. After the internal reaction temperature was confirmed to have arisen to 65 to 67° C., the reaction mixture was heated to 90° C. over 3 hours. The reaction mixture was then allowed to cool back to 60° C., at which a fresh supply (2.2 g) of the carbon-supported platinum catalyst (5 wt %) was charged, followed by dropwise addition of the compound (M-7) (107.3 g) into the flask over 1 hour. At that time, the internal temperature of the flask arose to 78° C. After completion of the dropwise addition, the reaction mixture was subjected to aging at 90° C. for 5 hours. The reaction mixture was then allowed to cool to room temperature, at which methyl isobutyl ketone (MIBK) (1,700 g) was added. The reaction mixture was then filtered under pressure through a filter to remove the platinum catalyst. Further, pure water (760 g) was added to the thus-obtained high-molecular compound solution. The resulting mixture was stirred, and was then allowed to stand for separation into layers. The lower layer, i.e., the water layer was removed. The separation and water-washing operation was repeated six times to eliminate trace acid components from the high-molecular compound solution. The solvent was distilled off under reduced pressure from the high-molecular compound solution, and cyclopentanone (950 g) was added to afford a high-molecular compound solution (B-1) having a solids concentration of 60 wt % and containing cyclopentanone as a principal solvent.

The molecular weight of the high-molecular compound in the high-molecular compound solution was measured by GPC. The high-molecular compound was found to have a weight average molecular weight of 51,000 in terms of polystyrene equivalent. In the formula (1), a=0.590, b=0.410, c=0, and d=0.

Synthesis Example 7

In a 5-L flask equipped with a stirrer, thermometer, nitrogen purge line and reflux condenser, the compound (M-1) (225.0 g) and the compound (M-2) (161.2 g) were dissolved in toluene (1,875 g). The compound (M-5) (949.6 g) and the compound (M-6) (6.1 g) were then added, followed by heating to 60° C. Subsequently, a carbon-supported platinum catalyst (5 wt %) (2.2 g) was charged. After the internal reaction temperature was confirmed to have arisen to 65 to 67° C., the reaction mixture was heated to 90° C. over 3 hours. The reaction mixture was then allowed to cool back to 60° C., at which a fresh supply (2.2 g) of the carbon-supported platinum catalyst (5 wt %) was charged, followed by dropwise addition of the compound (M-7) (107.3 g) into the flask over 1 hour. At that time, the internal temperature of the flask arose to 75° C. After completion of the dropwise addition, the reaction mixture was subjected to aging at 90° C. for 5 hours. The reaction mixture was then allowed to cool to room temperature, at which methyl isobutyl ketone (MIBK) (1,700 g) was added. The reaction mixture was then filtered under pressure through a filter to remove the platinum catalyst. Further, pure water (760 g) was added to the thus-obtained high-molecular compound solution. The resulting mixture was stirred, and was then allowed to stand for separation into layers. The lower layer, i.e., the water layer was removed. The separation and water-washing operation was repeated six times to eliminate trace acid components from the high-molecular compound solution. The solvent was distilled off under reduced pressure from the high-molecular compound solution, and cyclopentanone (900 g) was added to afford a high-molecular compound solution (B-2) having a solids concentration of 60 wt % and containing cyclopentanone as a principal solvent.

The molecular weight of the high-molecular compound in the high-molecular compound solution was measured by GPC. The high-molecular compound was found to have a weight average molecular weight of 53,000 in terms of polystyrene equivalent. In the formula (1), $(c+d)/(a+b+c+d)=0$.

Examples and Comparative Examples

The high-molecular compounds synthesized above in Synthesis Examples 1 to 7 and the high-molecular compounds C-1, C-2 to be shown below were provided. According to the compositions shown in Table 1, the solvent, acid anhydride, antioxidant, epoxy-containing crosslinking agent, basic compound/base generating agent, and other additives were added to the respective high-molecular compounds. Subsequent to stirring, mixing and dissolution, precision filtration was separately performed through a 0.2-μm "TEFLON (registered trademark)" filter to afford adhesive compositions (Examples 1 to 9, 19 and 21, and Comparative Examples 1 to 4).

Using a die coater as a film coater and a polyethylene terephthalate film (thickness: 38 μm) as a base film, the compositions of Examples 1 to 9 and Comparative Examples 1 to 4 were separately applied to a coat thickness of 50 μm on the base film. The thus-coated base films were then allowed to pass for 5 minutes through a circulating hot air oven set at 100° C. (length: 4 m) so that adhesive resin layers were formed on the respective base films. Polyethylene films (thickness: 50 μm) were then laminated onto the adhesive resin layers, respectively, under a pressure of 1 MPa between laminating rolls to produce adhesive dry films (Examples 10 to 18, 20 and 22, and Comparative Examples 5 to 8).

C-1: Butyl acrylate-ethyl acrylate-acrylonitrile-acrylic acid-hydroxyethyl acrylate=14.0:47.0:35.0:2.5:1.5 (Mw=450,000)

C-2:

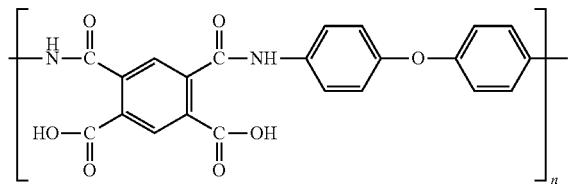

Mw = 75,000

Epoxy-Containing Crosslinking Agent

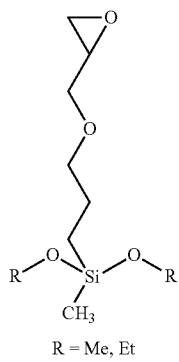

E-1

R = Me, Et

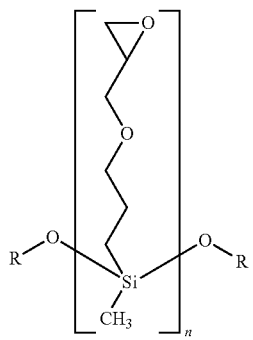

E-2

R = Me, Et
n = 1 20%
n = 2 75%
n ≥ 3 5%

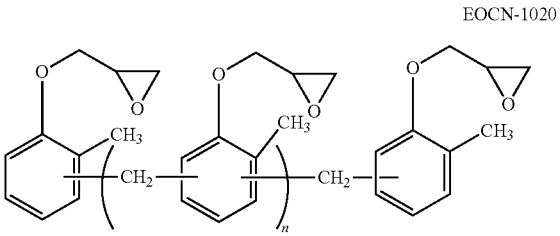

EOCN-1020 n = 3 to 6

TABLE 1

| Product | High-molecular compound | Acid anhydride | Antioxidant | Epoxy-containing crosslinking agent | Basic compound/base generating agent | Solvent | Film thickness (μm) |
|---|---|---|---|---|---|---|---|
| Composition | A-1 (100 parts) | Tetrahydro-phthalic anhydride (5 parts) | Irganox 3114 (1 part) | E-2 (3 parts) | U-CAT 5002 (0.1 parts) | Cyclopentanone (95 parts) | 24.5 |
| Dry film | | | CHIBASSORB 119FL (1 part) | | | | 50.1 |
| Composition | A-2 (100 parts) | Tetrahydro-phthalic anhydride (5 parts) | Irganox 3114 (1 part) | E-2 (3 parts) | | Cyclopentanone (95 parts) | 25.0 |
| Dry film | | | CHIBASSORB 119FL (1 part) | | | | 50.3 |
| Composition | A-3 (100 parts) | Tetrahydro-phthalic anhydride (5 parts) | Irganox 3114 (1 part) | E-2 (3 parts) | | Cyclopentanone (95 parts) | 24.9 |
| Dry film | | | CHIBASSORB 119FL (1 part) | | | | 49.6 |
| Composition | A-4 (100 parts) | Tetrahydro-phthalic anhydride (5 parts) | Irganox 3114 (1 part) | E-2 (3 parts) | | Cyclopentanone (95 parts) | 24.9 |
| Dry film | | | CHIBASSORB 119FL (1 part) | | | | 49.9 |
| Composition | A-5 (100 parts) | Tetrahydro-phthalic anhydride (5 parts) | Irganox 3114 (1 part) | E-1 (3 parts) | | Cyclopentanone (95 parts) | 25.0 |
| Dry film | | | CHIBASSORB 119FL (1 part) | | | | 50.0 |
| Composition | A-3 (100 parts) | Tetrahydro-phthalic anhydride (5 parts) | Irganox 3114 (1 part) | E-2 (3 parts) | | Cyclopentanone (95 parts) | 24.8 |
| Dry film | | | CHIBASSORB 119FL (1 part) | | | | 50.1 |
| Composition | A-3 (100 parts) | Tetrahydro-phthalic anhydride (5 parts) | | E-2 (3 parts) | | Cyclopentanone (95 parts) | 25.2 |
| Dry film | | | | | | | 50.5 |
| Composition | A-3 (100 parts) | Tetrahydro-phthalic anhydride (5 parts) | Irganox 3114 (1 part) | EOCN-1020 (10 parts) | WPBG-034 (0.1 parts) | Cyclopentanone (95 parts) | 24.9 |
| Dry film | | | CHIBASSORB 119FL (1 part) | | | | 50.0 |
| Composition | A-3 (100 parts) | Tetrahydro-phthalic anhydride (5 parts) | Irganox 3114 (1 part) | E-2 (3 parts) | U-CAT 5002 (0.1 parts) | Cyclopentanone (95 parts) | 24.5 |
| Dry film | | | CHIBASSORB 119FL (1 part) | | | | 48.9 |
| Composition | A-2 (100 parts) | Tetrahydro-phthalic anhydride (20 parts) | Irganox 3114 (1 part) | E-2 (3 parts) | | Cyclopentanone (95 parts) | 24.9 |
| Dry film | | | CHIBASSORB 119FL (1 part) | | | | 49.8 |
| Composition | A-2 (100 parts) | Trimellitic anhydride (10 parts) | Irganox 3114 (1 part) | E-2 (3 parts) | | Cyclopentanone (95 parts) | 24.6 |
| Dry film | | | CHIBASSORB 119FL (1 part) | | | | 50.2 |
| Composition | B-1 (100 parts) | Tetrahydro-phthalic anhydride (5 parts) | Irganox 3114 (1 part) | E-2 (3 parts) | | Cyclopentanone (95 parts) | 24.4 |
| Dry film | | | CHIBASSORB 119FL (1 part) | | | | 49.1 |
| Composition | B-2 (100 parts) | Tetrahydro-phthalic anhydride (5 parts) | Irganox 3114 (1 part) | E-2 (3 parts) | | Cyclopentanone (95 parts) | 25 |
| Dry film | | | CHIBASSORB 119FL (1 part) | | | | 50.1 |
| Composition | C-1 (100 parts) | | | EOCN-1020 (10 parts) | Imidazole (0.1 parts) | Cyclopentanone (200 parts) | 27.1 |
| Dry film | | | | | | | 50.7 |
| Composition | C-2 (100 parts) | | Irganox 3114 (1 part) | E-2 (3 parts) | | Cyclopentanone (100 parts) | 24.7 |
| Dry film | | | CHIBASSORB 119FL (1 part) | | | | 49.8 |

U-CAT 5002 (trademark): DBU tetraphenyl borate (product of San-Apro Ltd.)
WPEG-034 (trademark): 9-anthryl methyl-1-imidazolylcarboxylate (product of Wako Pure Chemical Industries, Ltd.)

Using a spin coater, the adhesive compositions of the examples and comparative examples were next coated on 8-inch silicon wafers, respectively, to the corresponding film thicknesses described in Table 1. To remove the solvent, the coated silicon wafers were prebaked at 130° C. for 5 minutes on a hot plate. In addition, further 8-inch silicon wafers were mounted on a film laminating apparatus. The adhesive resin layers, which had been exposed by peeling off the protective films from the adhesive dry films of the respective examples and comparative examples and had the corresponding film thicknesses described above in Table 1, were brought into close contact with the 8-inch silicon wafers, respectively, under a pressure of 1 MPa by a laminating roll on a table of 110° C. in a vacuum chamber controlled at a vacuum degree of 100 Pa. To remove the solvent, prebaking was then performed at 130° C. for 5 minutes on a hot plate.

The resulting 8-inch silicon wafers with the adhesive compositions and adhesive dry films applied thereon were then subjected to pre-joining at a joining temperature of 150° C., a joining-time depressurization of $4 \times 10^{-3}$ mbar and a joining pressure of 2 kN with a pre-joining holding time being set at 1 minute. The pre-joined 8-inch silicon wafers were heat-cured at 200° C. for 2 hours to afford completely-joined 8-inch silicon wafers.

The evaluation of various properties was performed by the below-described methods.

Joining Ability:

Pre-joining was performed. After heat curing, each 8 inch wafer was observed at the entire surface thereof. From the extent of occurrence of voids (un-bonded parts), the joining ability was evaluated in accordance with the following evaluation standards:

⊚: No voids occurred over the entire surface
○: Voids occurred at 50% or less of the outer peripheral part (edge part)
Δ: Voids occurred only at the outer peripheral part (edge part)
X: Voids occurred over the entire surface Adhesion:

After coating each adhesive composition or bonding each adhesive dry film on a silicon wafer substrate, a protective glass substrate cut into a 2 mm by 2 mm chip by a dicer was joined on the silicon wafer substrate, followed by heat curing. The substrate after the heat curing was evaluated for adhesion based on resistance force produced upon peeling off the chip-protective glass substrate from the wafer substrate by a bond tester ("Dage series 4000-PXY," trademark; manufactured by Dage Japan Co., Ltd). As test conditions, the testing speed was set at 50.0 μm/sec and the testing height was set at 800 μm. In FIG. 1, the adhesion testing method is illustrated. FIG. 1 shows a silicon (Si) wafer substrate 1, a joined protective glass substrate 2 (diameter: 2 mm×2 mm, film thickness: 500 μm), a measuring jig 3 of the bond tester, and a moving direction 4 of the measuring jig. A numerical value obtained was an average of measurements on five chips, and the greater the numerical value, the higher the adhesion between the wafer substrate and the protective glass substrate.

Heat Resistance:

After each adhesive composition or adhesive dry film was spin-coated or laminated on a glass substrate of 500 μm thickness, heat curing was conducted at 200° C. for 2 hours in a $N_2$ atmosphere and an initial transmittance (wavelength: 400 nm) was measured. The glass substrate was then heated at 265° C. for 3 minutes on a hot plate in air. After the heating, its transmittance (wavelength: 400 nm) was measured again to determine the attenuation rate (%)=the transmittance after the heating (wavelength: 400 nm)/the initial transmittance (wavelength: 400 nm)×100.

Light Resistance:

After each adhesive composition or adhesive dry film was spin-coated or laminated on a glass substrate of 500 μm thickness, heat curing was conducted at 200° C. for 2 hours in a $N_2$ atmosphere and an initial transmittance (wavelength: 400 nm) was measured. After exposed to 5 million lux simulated sunlight (cut-off wavelengths: 350 nm and shorter), its transmittance (wavelength: 400 nm) was measured again to determine the attenuation rate (%)=the transmittance after the exposure (wavelength: 400 nm)/the initial transmittance (wavelength: 400 nm)×100.

Warp of Joined Wafer:

A 8-inch silicon wafer substrate and a protective glass substrate were joined with each adhesive composition or adhesive dry film, followed by heat curing. Using a back-side polisher, the resulting 8-inch silicon wafer was subjected at its silicon side to polishing from 725 μm (initial) to 100 μm. The warp of the joined 8-inch silicon wafer after the back-side polishing was measured.

The results of the above-described evaluations are shown in Table 2.

TABLE 2

| | | | | Reliability (transmittance) | | |
|---|---|---|---|---|---|---|
| | Product | Joining ability | Adhesion (N) | Heat resistance (%) | Light resistance (%) | Warp (μm) |
| Example 1 | Composition | Δ | 55.0 | 97.1 | 97.8 | 26.96 |
| Example 10 | Dry film | ○ | 58.5 | 97.5 | 97.7 | 18.73 |
| Example 2 | Composition | ⊚ | 63.2 | 98.9 | 100.0 | 11.25 |
| Example 11 | Dry film | ⊚ | 61.1 | 99.0 | 100.0 | 8.95 |
| Example 3 | Composition | ⊚ | 69 | 99.1 | 100.0 | 7.26 |
| Example 12 | Dry film | ⊚ | 72 | 99.0 | 100.0 | 3.47 |
| Example 4 | Composition | ⊚ | 67.4 | 99.3 | 100.0 | 7.07 |
| Example 13 | Dry film | ⊚ | 66.3 | 99.4 | 100.0 | 3.31 |
| Example 5 | Composition | ○ | 73.5 | 97.2 | 100.0 | 16.54 |
| Example 14 | Dry film | ⊚ | 76.7 | 97.8 | 100.0 | 11.12 |
| Example 6 | Composition | ⊚ | 68.8 | 99.1 | 100.0 | 7.03 |
| Example 15 | Dry film | ⊚ | 72.5 | 99.0 | 100.0 | 3.55 |
| Example 7 | Composition | ⊚ | 66.7 | 62.1 | 88.8 | 7.29 |
| Example 16 | Dry film | ⊚ | 63.9 | 65.7 | 90.9 | 4.00 |
| Example 8 | Composition | ○ | 57.0 | 80.5 | 99.8 | 8.49 |
| Example 17 | Dry film | ○ | 58.2 | 81.8 | 100.0 | 10.02 |
| Example 9 | Composition | ⊚ | 77.4 | 97.4 | 100.0 | 9.56 |
| Example 18 | Dry film | ⊚ | 79.1 | 96.9 | 100.0 | 9.11 |
| Example 19 | Composition | ⊚ | 64.5 | 99.1 | 99.7 | 13.1 |
| Example 20 | Dry film | ⊚ | 63.2 | 99.0 | 99.8 | 10.5 |
| Example 21 | Composition | ⊚ | 65.1 | 98.8 | 100.0 | 17.4 |
| Example 22 | Dry film | ⊚ | 64.3 | 99.1 | 99.9 | 12.1 |
| Comparative Example 1 | Composition | Δ | 32.0 | 90.2 | 97.2 | 156.23 |
| Comparative Example 5 | Dry film | Δ | 36.2 | 92.3 | 97.2 | 130.38 |

TABLE 2-continued

| | | | | Reliability (transmittance) | | |
| | Product | Joining ability | Adhesion (N) | Heat resistance (%) | Light resistance (%) | Warp (μm) |
|---|---|---|---|---|---|---|
| Comparative Example 2 | Composition | X | 41.2 | 85.3 | 95.0 | 188.0 |
| Comparative Example 6 | Dry film | Δ | 47.3 | 88.7 | 96.5 | 170.4 |
| Comparative Example 3 | Composition | Δ | 29.4 | 66.4 | 100.0 | 432.9 |
| Comparative Example 7 | Dry film | Δ | 33.2 | 69.8 | 100.0 | 410.7 |
| Comparative Example 4 | Composition | X | 51.1 | 54.9 | 85.1 | 588.2 |
| Comparative Example 8 | Dry film | Δ | 49.6 | 55.6 | 87.4 | 499.8 |

Japanese Patent Application No. 2011-036670 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An adhesive composition comprising the following components (A) and (B) and (C):

(A) an epoxy-containing high-molecular compound having a weight average molecular weight of 3,000 to 500,000 and repeating units represented by the following formula (1):

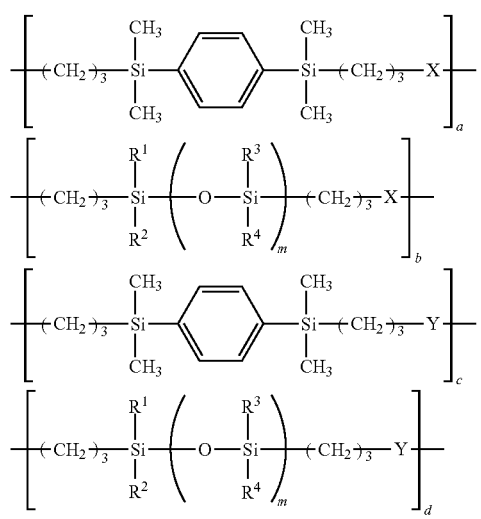

wherein $R^1$ to $R^4$ may be the same or different and each represent a monovalent hydrocarbon group having 1 to 8 carbon atoms, m is an integer of 1 to 100, a, b, c and d indicate ratios of respective repeating units based on a number of all repeating units and each stand for 0 or a positive number with a proviso that c and d are not 0 at the same time and $0<(c+d)/(a+b+c+d)\leq1.0$ is satisfied, X is a divalent organic group represented by the following formula (2), Y is a divalent organic group represented by the following formula (3), and at least one divalent organic group represented by the formula (3) exists

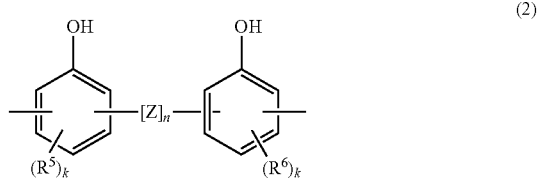

wherein Z is a divalent organic group selected from

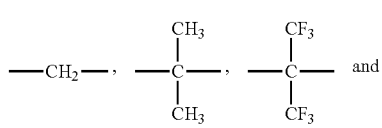

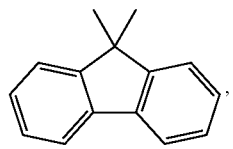

n is 0 or 1, $R^5$ and $R^6$ each represent an alkyl group or alkoxy group having 1 to 4 carbon atoms and may be the same or different, and k is 0, 1 or 2,

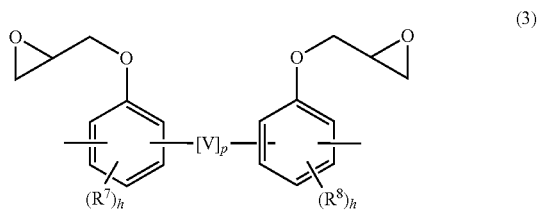

wherein V is a divalent organic group selected from

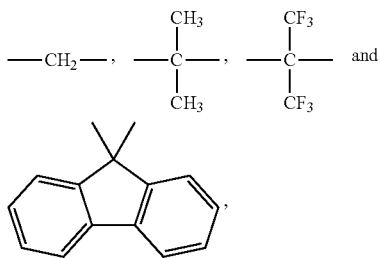

p is 0 or 1, $R^7$ and $R^8$ each represent an alkyl group or alkoxy group having 1 to 4 carbon atoms and may be the same or different, and h is 0, 1 or 2;
(B) a solvent, and
(C) an acid anhydride.

2. The adhesive composition of claim 1, wherein in the formula (1), $0.05 \leq c/(a+b+c+d) \leq 0.5$ is satisfied.

3. The adhesive composition of claim 1, wherein in the formula (1), $0.05 \leq d/(a+b+c+d) \leq 0.5$ is satisfied.

4. The adhesive composition of claim 1, wherein the acid anhydride (C) is represented by the following formula (4):

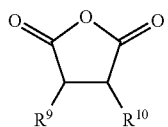

(4)

wherein $R^9$ and $R^{10}$ each represent a hydrogen atom, or a substituted or unsubstituted alkyl group or SiO-containing alkyl group having 1 to 10 carbon atoms and may be the same or different; and $R^9$ and $R^{10}$ may be bonded to each other to form a 3-membered to 7-membered ring structure together with the carbon atoms to which $R^9$ and $R^{10}$ are bonded, or in each two molecules of the acid anhydride represented by the formula (4), respective $R^9$s and respective $R^{10}$s may each be bonded to each other to form a 4-membered to 12-membered ring structure together with the carbon atoms to which the corresponding ones of the $R^9$s and $R^{10}$s are bonded, or respective $R^9$s or respective $R^{10}$s may be bonded to each other directly or via an alkylene group which may contain an oxygen atom or a siloxane bond, or in each two molecules of the acid anhydride represented by the formula (4), $R^9$ and $R^{10}$ in each molecule may be bonded to each other to form a 3-membered to 7-membered ring structure together with the carbon atoms to which $R^9$ and $R^{10}$ are bonded, and one carbon atoms in the respective ring structures may be bonded to each other.

5. The adhesive composition of claim 4, wherein the acid anhydride (C) is selected from the group consisting of phthalic anhydride, trimellitic anhydride, pyromellitic anhydride, benzophenonetetracarboxylic acid anhydride, ethylene glycol bistrimellitate, maleic anhydride, tetrahydrophthalic anhydride, methyltetrahydrophthalic anhydride, endomethylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexenedicarboxylic acid anhydride, and acid anhydrides represented by the following formulas:

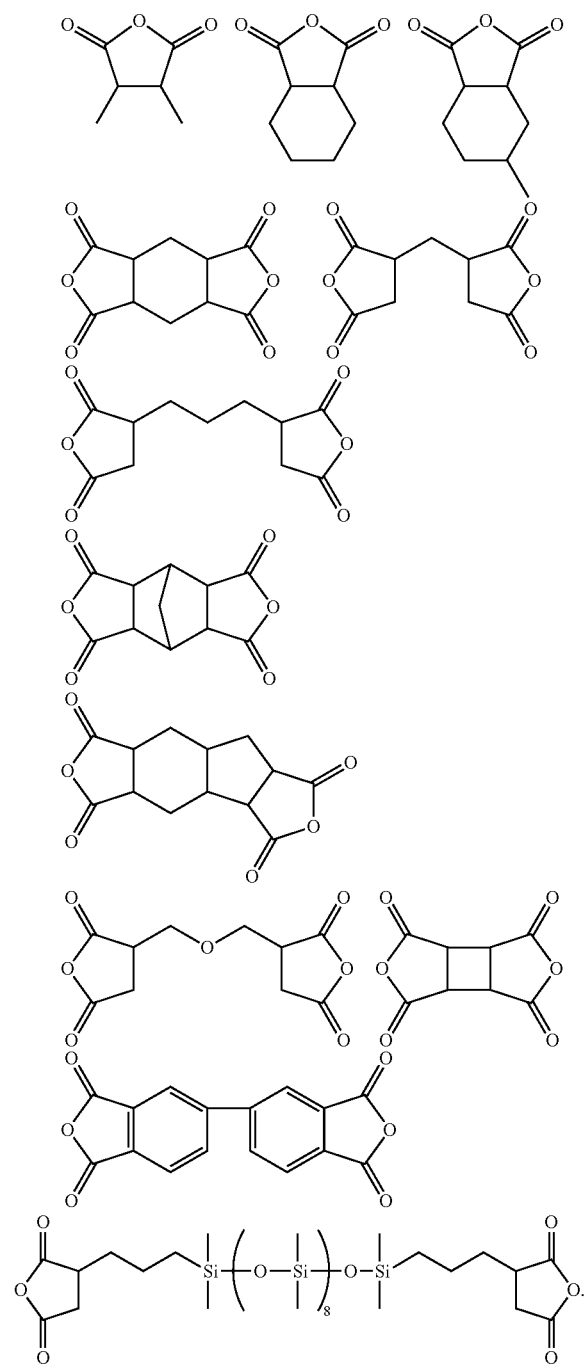

6. The adhesive composition of claim 1, further comprising:
(D) an antioxidant.

7. The adhesive composition of claim 1, further comprising:
(E) an epoxy-containing crosslinking agent.

8. The adhesive composition of claim 1, further comprising:
(F) a basic compound or base generating agent.

9. The adhesive composition of claim 1, configured for use as a CCD or CMOS image sensor.

10. An adhesive dry film comprising a base film and an adhesive resin layer formed on the base film from the adhesive composition of claim 1.

11. A solid-state image sensor device comprising a laminate formed from a substrate, a layer of the adhesive composition of claim 1, and a protective glass plate, said substrate being selected from the group consisting of silicon wafers, silicon wafers with solid-state image sensors formed thereon, plastic substrates, ceramic substrates, and metal circuit boards.

* * * * *